(12) United States Patent
Iwamatsu et al.

(10) Patent No.: US 11,836,147 B2
(45) Date of Patent: Dec. 5, 2023

(54) INFORMATION PROCESSING APPARATUS, ANALYSIS SYSTEM, DATA AGGREGATION METHOD, AND COMPUTER READABLE MEDIUM

(71) Applicant: NEC Corporation, Tokyo (JP)

(72) Inventors: Yosuke Iwamatsu, Tokyo (JP); Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 17/439,496

(22) PCT Filed: Mar. 25, 2019

(86) PCT No.: PCT/JP2019/012342
§ 371 (c)(1),
(2) Date: Sep. 15, 2021

(87) PCT Pub. No.: WO2020/194421
PCT Pub. Date: Oct. 1, 2020

(65) Prior Publication Data
US 2022/0156261 A1 May 19, 2022

(51) Int. Cl.
G06F 16/2458 (2019.01)
G06F 16/22 (2019.01)
G06F 16/2455 (2019.01)

(52) U.S. Cl.
CPC ...... *G06F 16/2477* (2019.01); *G06F 16/2272* (2019.01); *G06F 16/24556* (2019.01)

(58) Field of Classification Search
CPC ............ G06F 16/2477; G06F 16/2272; G06F 16/24556; G06T 7/20; H04N 7/18
See application file for complete search history.

(56) References Cited

U.S. PATENT DOCUMENTS 10,733,472 B2 * 8/2020 Zamfir ............... H04N 5/272
2012/0041617 A1   2/2012 Aimura et al.
(Continued)

FOREIGN PATENT DOCUMENTS

JP   H10-072851 A   3/1998
JP   H11-149313 A   6/1999
(Continued)

OTHER PUBLICATIONS

International Search Report for PCT Application No. PCT/JP2019/012342, dated May 21, 2019.
(Continued)

*Primary Examiner* — Cam Y T Truong

(57) ABSTRACT

An information processing apparatus (100) includes: an acquisition unit (110) configured to acquire first time-series data including presence area information in a target space in subjects; a data set generation unit (120) configured to generate a plurality of data sets from presence area information regarding a specific subject; an estimation unit (130) configured to estimate an accuracy of analyzing a distribution regarding the subject in the target space based on presence area information; a determination unit (140) configured to determine a time width of an aggregation target based on the data reduction degree due to the aggregation in each data set and an accuracy of analysis; and an aggregation unit (150) configured to perform aggregation on a data set that corresponds to the determined time width to representative data.

9 Claims, 28 Drawing Sheets

(56) References Cited

U.S. PATENT DOCUMENTS

2015/0310736 A1* 10/2015 Yamada .................. G08C 17/02
398/107
2018/0150974 A1* 5/2018 Abe .......................... G06T 7/74

FOREIGN PATENT DOCUMENTS

| JP | 2004-020392 A | 1/2004 |
| JP | 2006-054569 A | 2/2006 |
| JP | 2008-246175 A | 9/2006 |
| JP | 2008-146151 A | 6/2008 |
| JP | 2008-263657 A | 10/2008 |
| JP | 2010-257377 A | 11/2010 |
| JP | 2019-032588 A | 2/2019 |

OTHER PUBLICATIONS

Mikami et al., "Memory-based particle filter: Robust visual tracking based on prior prediction using past state history", The IEICE Transactions on Information and Systems, vol. J93-D, No. 8. Aug. 1, 2010, pp. 1313-1328.

* cited by examiner

| TIME WIDTH | MAXIMUM VALUE OF MOVING DISTANCE (px) | ESTIMATED ACCURACY OF ANALYSIS a |
|---|---|---|
| 5 SECONDS | 50 | 0.90 |
| 10 SECONDS | 100 | 0.85 |
| 20 SECONDS | 200 | 0.60 |
| 40 SECONDS | 500 | 0.30 |

Fig. 15

| TIME WIDTH | CALCULATED DATA REDUCTION RATE b |
|---|---|
| 5 SECONDS | 0.8 |
| 10 SECONDS | 0.9 |
| 20 SECONDS | 0.95 |
| 40 SECONDS | 0.975 |

Fig. 17

| TIME WIDTH | ESTIMATED ACCURACY OF ANALYSIS a | CALCULATED DATA REDUCTION RATE b | SATISFACTION OF ACCURACY OF ANALYSIS Sa | SATISFACTION OF DATA REDUCTION RATE Sb | SATISFACTION (OVERALL) c |
|---|---|---|---|---|---|
| 5 SECONDS | 0.90 | 0.8 | 0.90 | 0.5 | 0.45 |
| 10 SECONDS | 0.85 | 0.9 | 0.85 | 0.7 | 0.595 |
| 20 SECONDS | 0.60 | 0.95 | 0.60 | 0.8 | 0.48 |
| 40 SECONDS | 0.30 | 0.975 | 0.0 | 0.9 | 0.0 |

Fig. 20

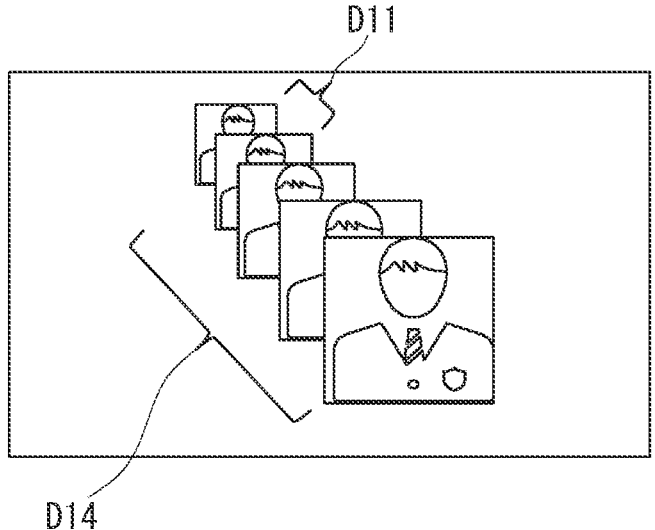
FLUCTUATION OF SIZE IS 1.2 TIMES
⇒ DATA LOSS IN DATA SECTION (bin) IN ANALYSIS IS NOT LIKELY TO OCCUR
D11
D14
FLUCTUATION OF SIZE IS 3.8 TIMES
⇒ DATA LOSS IN DATA SECTION (bin) IN ANALYSIS IS LIKELY TO OCCUR
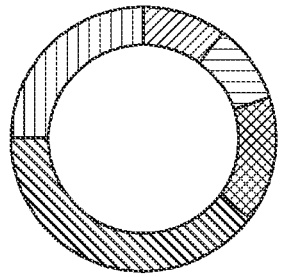
- ~50px × 50px
- ~100px × 100px
- ~200px × 200px
- ~400px × 400px
- ~500px × 500px
Fig. 25

| TIME WIDTH | FLUCTUATION OF SIZE OF SUBJECT | ESTIMATED ACCURACY OF ANALYSIS a |
|---|---|---|
| 5 SECONDS | 1.2 | 0.90 |
| 10 SECONDS | 2.0 | 0.55 |
| 30 SECONDS | 2.8 | 0.40 |
| 40 SECONDS | 3.8 | 0.25 |

| TIME WIDTH | ESTIMATED ACCURACY OF ANALYSIS a | CALCULATED DATA REDUCTION RATE b | SATISFACTION OF ACCURACY OF ANALYSIS Sa | SATISFACTION OF DATA REDUCTION RATE Sb | SATISFACTION (OVERALL) c |
|---|---|---|---|---|---|
| 5 SECONDS | 0.90 | 0.8 | 0.90 | 0.5 | 0.45 |
| 10 SECONDS | 0.55 | 0.9 | 0.55 | 0.7 | 0.385 |
| 20 SECONDS | 0.40 | 0.95 | 0.40 | 0.8 | 0.32 |
| 40 SECONDS | 0.25 | 0.975 | 0.25 | 0.9 | 0.225 |

INFORMATION PROCESSING APPARATUS, ANALYSIS SYSTEM, DATA AGGREGATION METHOD, AND COMPUTER READABLE MEDIUM

This application is a National Stage Entry of PCT/JP2019/012342 filed on Mar. 25, 2019, the contents of all of which are incorporated herein by reference, in their entirety.

TECHNICAL FIELD

The present disclosure relates to an information processing apparatus, an analysis system, a data aggregation method, and a non-transitory computer readable medium storing a program.

BACKGROUND ART

In recent years, development of respective techniques for analyzing time-series sensing data related to a subject, which data is obtained by analyzing videos, images or the like of the subject and the like, and thus detecting dangerous situations, suspicious behavior or the like has been advancing.

Patent Literature 1 discloses a technique related to an image processing apparatus configured to detect a turning point of a scene based on a change in brightness between one image frame and the next image frame in moving image data and create an optimal thumbnail that corresponds to the scene change. Patent Literature 2 discloses a technique related to an apparatus for preventing image quality from being degraded when moving image data is compressed and restored. Patent Literature 3 discloses a technique related to a moving image conversion apparatus for reducing an amount of data of the whole moving image while leaving important frames in the moving image. Patent Literature 4 discloses a technique related to a vehicle periphery monitoring device configured to monitor a periphery of a vehicle using an image captured by a camera mounted in the vehicle. The technique disclosed in Patent Literature 4 is for sampling images in a short time period when a change in a distance between a subject and the camera is large, thereby enabling the distance to be calculated without delay.

CITATION LIST

Patent Literature

[Patent Literature 1] Japanese Unexamined Patent Application Publication No. 2008-263657
[Patent Literature 2] Japanese Unexamined Patent Application Publication No. 2006-054569
[Patent Literature 3] Japanese Unexamined Patent Application Publication No. 2006-246175
[Patent Literature 4] Japanese Unexamined Patent Application Publication No. 2010-257377

SUMMARY OF INVENTION

Technical Problem

In the techniques disclosed in the aforementioned Patent Literature 1 to 4, regarding a specific subject included in a plurality of images captured in a predetermined period of time in a target space, an accuracy of analyzing a distribution regarding the specific subject in an image area is not taken into account. Therefore, there is a problem that it is difficult to reduce an amount of data while preventing the accuracy of the analysis from being degraded.

The present disclosure has been made to solve the aforementioned problems and the aim of the present disclosure is to provide an information processing apparatus, an analysis system, a data aggregation method, and a non-transitory computer readable medium storing a program for reducing an amount of data while preventing the accuracy of the analysis of a distribution regarding a specific subject included in a plurality of images captured in a predetermined period of time from being degraded.

Solution to Problem

An information processing apparatus according to a first aspect of the present disclosure includes:
  an acquisition unit configured to acquire first time-series data including presence area information in a target space in one or more subjects included in a plurality of images captured from the target space in a predetermined period of time;
  a data set generation unit configured to generate, from the presence area information regarding a specific subject of the first time-series data, a plurality of data sets for a plurality of different time widths from a starting point of the predetermined period of time;
  an estimation unit configured to estimate, for each of the plurality of time widths, an accuracy of analyzing a distribution regarding the subject in the target space in a case in which an aggregation is performed on each of the data sets to representative data based on the presence area information included in each of the plurality of data sets;
  a determination unit configured to determine a time width of an aggregation target based on a data reduction degree due to the aggregation in each data set and the accuracy of the analysis; and
  an aggregation unit configured to perform aggregation on a data set that corresponds to the determined time width to the representative data.

An analysis system according to a second aspect of the present disclosure includes:
  an analysis apparatus configured to analyze a plurality of images captured from a target space in which one or more subjects are present in a predetermined period of time and output first time-series data including presence area information in the target space in a subject;
  a data aggregation apparatus including: an acquisition unit configured to acquire the first time-series data from the analysis apparatus; a data set generation unit configured to generate, from the presence area information regarding a specific subject of the first time-series data, a plurality of data sets for a plurality of different time widths from a starting point of the predetermined period of time; an estimation unit configured to estimate, for each of the plurality of time widths, an accuracy of analyzing a distribution regarding the subject in the target space in a case in which the aggregation is performed on each of the data sets to representative data based on the presence area information in each of the plurality of data sets; a determination unit configured to determine a time width of an aggregation target based on a data reduction degree due to the aggregation in each data set and the accuracy of analysis; and an aggregation unit configured to perform aggregation on a data set that corresponds to the determined time width to the representative data;

a storage apparatus configured to store the aggregated representative data; and a data analysis apparatus configured to analyze a distribution regarding the subject in the target space from the representative data stored in the storage apparatus.

A data aggregation method according to a third aspect of the present disclosure causes a computer to perform the following processing of:

acquiring first time-series data including presence area information in a target space in one or more subjects included in a plurality of images captured from the target space in a predetermined period of time;

generating, from the presence area information regarding a specific subject of the first time-series data, a plurality of data sets for a plurality of different time widths from a starting point of the predetermined period of time;

estimating, for each of the plurality of time widths, an accuracy of analyzing a distribution regarding the subject in the target space in a case in which the aggregation is performed on each of the data sets to representative data based on the presence area information in each of the plurality of data sets;

determining a time width of an aggregation target based on a data reduction degree due to the aggregation in each data set and the accuracy of analysis; and performing aggregation on a data set that corresponds to the determined time width to the representative data.

A non-transitory computer readable medium storing a data aggregation program according to a fourth aspect of the present disclosure causes a computer to execute the following processing of:

acquiring first time-series data including presence area information in a target space in one or more subjects included in a plurality of images captured from the target space in a predetermined period of time;

generating, from the presence area information regarding a specific subject of the first time-series data, a plurality of data sets for a plurality of different time widths from a starting point of the predetermined period of time;

estimating, for each of the plurality of time widths, an accuracy of analyzing a distribution regarding the subject in the target space in a case in which the aggregation is performed on each of the data sets to representative data based on the presence area information in each of the plurality of data sets;

determining a time width of an aggregation target based on a data reduction degree due to the aggregation in each data set and the accuracy of analysis; and performing aggregation on a data set that corresponds to the determined time width to the representative data.

Advantageous Effects of Invention

According to the above aspects, it is possible to provide an information processing apparatus, an analysis system, a data aggregation method, and a non-transitory computer readable medium storing a program for reducing an amount of data while preventing the accuracy of the analysis of a distribution regarding a specific subject included in a plurality of images captured in a predetermined period of time from being degraded.

BRIEF DESCRIPTION OF DRAWINGS

FIG. 15 is a diagram showing an example of the accuracy of the analysis for each time width according to the second example embodiment;

FIG. 17 is a diagram showing an example of a data reduction rate for each time width according to the second example embodiment;

FIG. 20 is a diagram showing an example of satisfaction for each time width according to the second example embodiment;

FIG. 25 is a diagram showing an example of a fluctuation of the size of the subject data according to the third example embodiment;

FIG. 26 is a diagram showing an example of an accuracy of an analysis for each time width according to the third example embodiment;

FIG. 28 is a diagram showing an example of satisfaction for each time width according to the third example embodiment.

DESCRIPTION OF EMBODIMENTS

In the following, with reference to the drawings, example embodiments of the present disclosure will be described in detail. Throughout the drawings, the same or corresponding elements are denoted by the same reference symbols and overlapping descriptions will be omitted as necessary for the sake of clarification of the description.

First Example Embodiment

Figure 1:
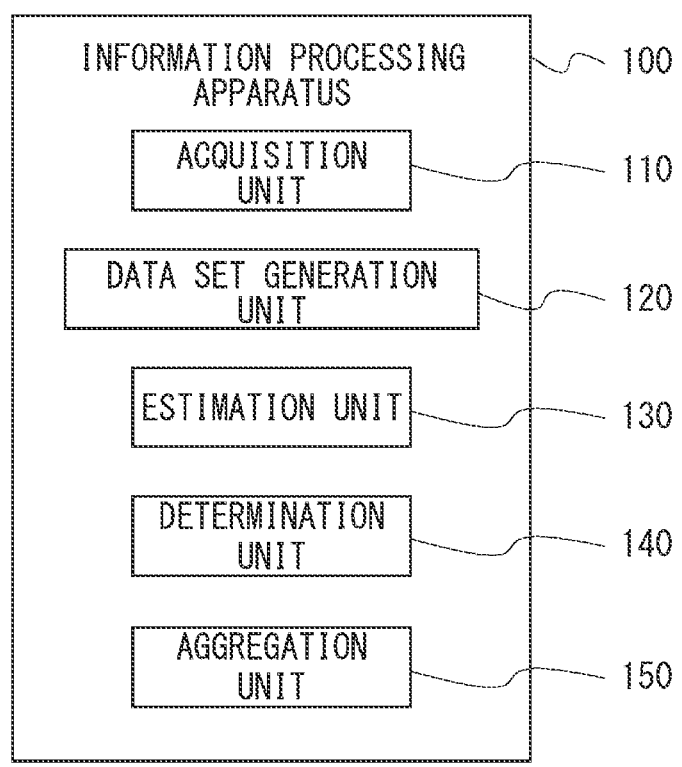
FIG. 1 is a block diagram showing a configuration of an information processing apparatus according to a first example embodiment.

FIG. 1 is a block diagram showing a configuration of an information processing apparatus 100 according to a first example embodiment. The information processing apparatus 100 is a computer that sequentially divides one or more pieces of subject data included in a plurality of images captured in a predetermined period of time from a target space into one of time widths of a plurality of different kinds, aggregates subject data after the division to representative data, and accumulates the representative data for analysis processing that will be performed later. The information processing apparatus 100 includes an acquisition unit 110, a data set generation unit 120, an estimation unit 130, a determination unit 140, and an aggregation unit 150.

The acquisition unit 110 acquires first time-series data including presence area information in a target space in one or more subjects included in a plurality of images captured in a predetermined period of time from the target space. Here, the target space, which is a space to be captured by an image-capturing device such as a camera installed in a predetermined position, includes at least one subject. Each image may be the one captured by a plurality of image-capturing devices installed in a plurality of different positions in the target space. Further, the subject is a mobile body such as a human, an animal, a package, or a vehicle (when the subject is a package, it may move together with a human or a vehicle), and is an object to be captured by a camera or the like. Further, the presence area information is information for specifying an area where a subject is present in the target space, and includes, for example, a coordinate group for specifying the contour of the subject, a coordinate group of a rectangular area obtained by approximating the contour of the subject, the size of the area, the shape of the area and the like. Then the first time-series data is a data group of a pair in which the presence area information and the shooting time are associated with each other. Further, the first time-series data may include presence area information (time-series data) for each shooting time for each of the plurality of subjects.

For example, the acquisition unit 110 receives, from an external device, the time-series subject data in which the presence area information of the subject has been extracted from a plurality of pieces of image data in advance in the external device. Alternatively, the acquisition unit 110 may read out and thus acquire the first time-series data stored in a storage device (not shown) included in the information processing apparatus 100.

The data set generation unit 120 generates, from the presence area information regarding a specific subject of the first time-series data, a plurality of data sets for a plurality of different time widths from the starting point of a predetermined period of time. When, for example, there are three time widths, the data set generation unit 120 generates the presence area information regarding a specific subject for a first time width from the starting point of a predetermined period of time as a first data set. Likewise, the data set generation unit 120 generates the presence area information regarding a specific subject for each of the second time width and the third time width from the starting point of the predetermined period of time as a second data set and a third data set. That is, the data set generation unit 120 generates data sets with different numbers of elements, the number of data sets corresponding to a number of predetermined time widths. Further, each data set has a common starting point. Note that the time width may also referred to as a time-division width.

The estimation unit 130 estimates, for each of the plurality of time widths, the accuracy of analyzing a distribution regarding the subject in the target space in a case in which an aggregation is performed on each of the plurality of data sets to the representative data based on the presence area information in each of the plurality of data sets. Here, the aggregation from the data set to the representative data means to calculate a representative value from a plurality of pieces of presence area information in the data set, discard a plurality of pieces of presence area information, and replace the data set by representative values. That is, an amount of data is reduced as a result of the aggregation. The representative value here may be the mean, the mode, the median or the like, and may be statistics (summary statistics) that typically represent the characteristics of a distribution of samples. Further, the distribution regarding the subject is, for example, the distribution of the presence locations of the subject in the target space, the distribution of the area sizes or the like. The accuracy of analyzing the distribution is the degree of degradation of the accuracy when the analysis of the distribution is performed on the representative data after aggregation as compared to a case in which analysis of the distribution regarding the subject has been performed on the data set before aggregation. Note that the estimation unit 130 does not actually perform aggregation and estimates the accuracy of the analysis, assuming that aggregation has been performed on each data set to representative data.

The determination unit 140 determines the time width of the aggregation target based on the data reduction degree due to the aggregation in each data set and the accuracy of the analysis. The data reduction degree due to the aggregation in the data set is an estimated degree of an amount of data to be reduced when the aggregation from the data set to the representative data is performed. Then, the determination unit 140 determines, from among a plurality of time widths, a time width in which the data reduction degree and the accuracy of the analysis are well-balanced as a time width of the aggregation target.

The aggregation unit 150 performs aggregation on the data set that corresponds to the determined time width to the representative data. That is, as described above, the aggregation unit 150 aggregates data by calculating the representative value from a plurality of pieces of presence area information in the data set that corresponds to the determined time width.

Figure 2:
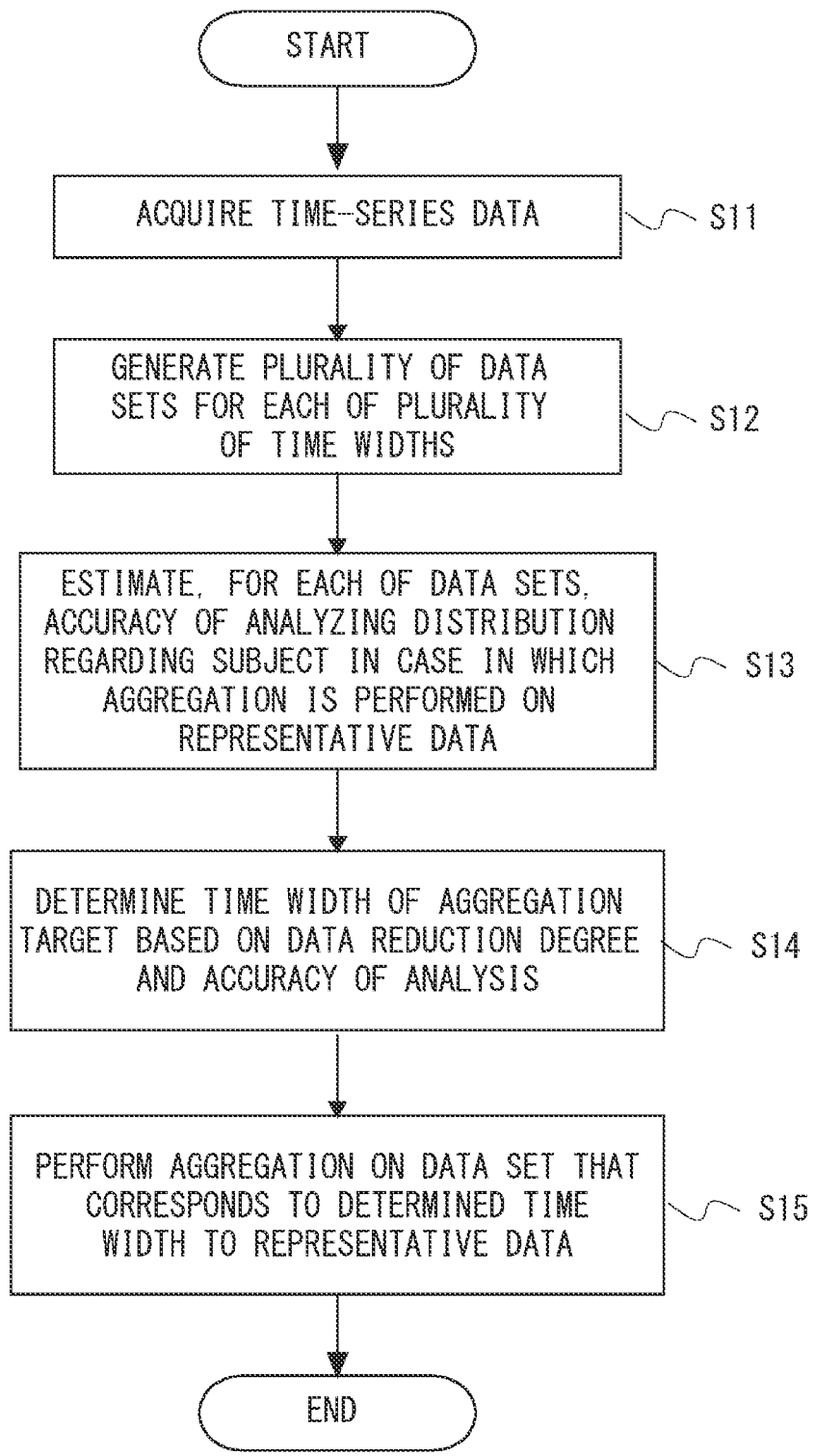
FIG. 2 is a flowchart showing a flow of a data aggregation method according to the first example embodiment.

FIG. 2 is a flowchart showing a flow of a data aggregation method according to the first example embodiment. First, the acquisition unit 110 acquires the first time-series data including presence area information in the target space in one or more subjects included in a plurality of images captured in a predetermined period of time from the target space (S11). Next, the data set generation unit 120 generates a plurality of data sets for a plurality of different time widths from the starting point of the predetermined period of time from the presence area information regarding a specific subject of the first time-series data (S12). Then, the estimation unit 130 estimates, for each of the plurality of time widths, the accuracy of analyzing a distribution regarding the subject in the target space in a case in which the aggregation is performed on each of the data sets to the representative data based on the presence area information in each of the plurality of data sets (S13). Then, the determination unit 140 determines the time width of the aggregation target based on the data reduction degree due to the aggregation in each data set and the accuracy of the analysis (S14). After that, the aggregation unit 150 performs aggregation on the data set that corresponds to the determined time width to the representative data (S15).

As described above, according to this example embodiment, data sets of the subject having a plurality of different time widths are generated for time-series subject data, thereby obtaining an accuracy of the analysis when aggregation is performed on each data set. Further, a data reduction degree for each time width is also used. Then, the time width is determined in view of the accuracy of the analysis and the data reduction degree, and aggregation is performed on the data set of the subject in the determined time width. Therefore, it is possible to reduce an amount of data while preventing the accuracy of the analysis of the distribution regarding a specific subject included in a plurality of images captured in a predetermined period of time from being degraded.

Note that the information processing apparatus 100 includes, as a configuration that is not shown, a processor, a memory, and a storage device. Further, a computer program in which processing of the data aggregation method according to this example embodiment is implemented is stored in the storage device. Further, the processor loads the computer program from the storage device into the memory and executes the loaded computer program. In this way, the processor implements the functions of the acquisition unit 110, the data set generation unit 120, the estimation unit 130, the determination unit 140, and the aggregation unit 150.

Alternatively, each of the acquisition unit 110, the data set generation unit 120, the estimation unit 130, the determination unit 140, and the aggregation unit 150 may be implemented by dedicated hardware. Further, some or all of the components of each apparatus may be implemented by a general-purpose or special-purpose circuit (circuitry), a processor or the like, or a combination thereof. They may be formed of a single chip, or may be formed of a plurality of chips connected to each other through a bus. Some or all of the components of each apparatus may be implemented by a combination of the above-described circuit or the like and a program. Further, as the processor, a Central Processing Unit (CPU), a Graphics Processing Unit (GPU), a field-programmable gate array (FPGA) or the like may be used.

Further, when some or all of the components of the information processing apparatus 100 are implemented by a plurality of information processing apparatuses, circuits, or the like, the plurality of information processing apparatuses, the circuits, or the like may be disposed in one place in a centralized manner or arranged in a distributed manner. For example, the information processing apparatuses, the circuits, and the like may be implemented as a client-server system, a cloud computing system or the like, or a configuration in which the apparatuses or the like are connected to each other through a communication network. Alternatively, the functions of the information processing apparatus 100 may be provided in the form of Software as a Service (SaaS).

Second Example Embodiment

A second example embodiment is a specific example of the aforementioned first example embodiment.

Now, problems solved by the present disclosure will be described in detail. First, as described above, there has been a growing demand for techniques for analyzing a distribution (the presence location or the size) regarding a subject in a target space from a large amount of time-series sensing data regarding a subject, and thus detecting dangerous situations, suspicious behavior and so on.

Figure 3:
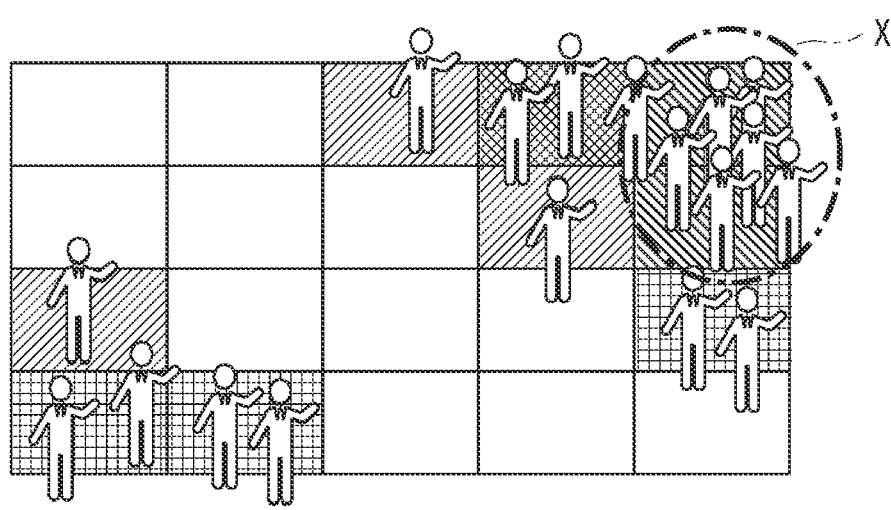
FIG. 3 is a diagram for describing the concept of a distribution of presence locations of a subject.

FIG. 3 is a diagram for describing the concept of a distribution of the presence locations of the subject. In FIG. 3, the target space is shown in a plane, which is divided into a plurality of rectangular areas in a mesh shape, and the number of subjects that are present in each area in the analysis target period is conceptually shown. For example, since the subjects are concentrated and a number of subjects are included in the area X than in the other areas, it can be analyzed that the area X is a high-risk area.

However, in order to perform the above analysis, a large amount of storage capacity is required in order to accumulate a large amount of sensing data (subject data), and an amount of processing for the analysis increases as well. For example, since the subject data generated for each fame increases even in a short period of time, a large amount of storage is required to accumulate the data. Further, along with the increase in the amount of data, an amount of processing required for statistical analysis increases as well.

In order to solve the above problems, it may be possible to compress the accumulated sensing data by aggregation. However, aggregation of the sensing data causes data to be lost, which may likely to cause the accuracy of the analysis to be degraded.

Figure 4:
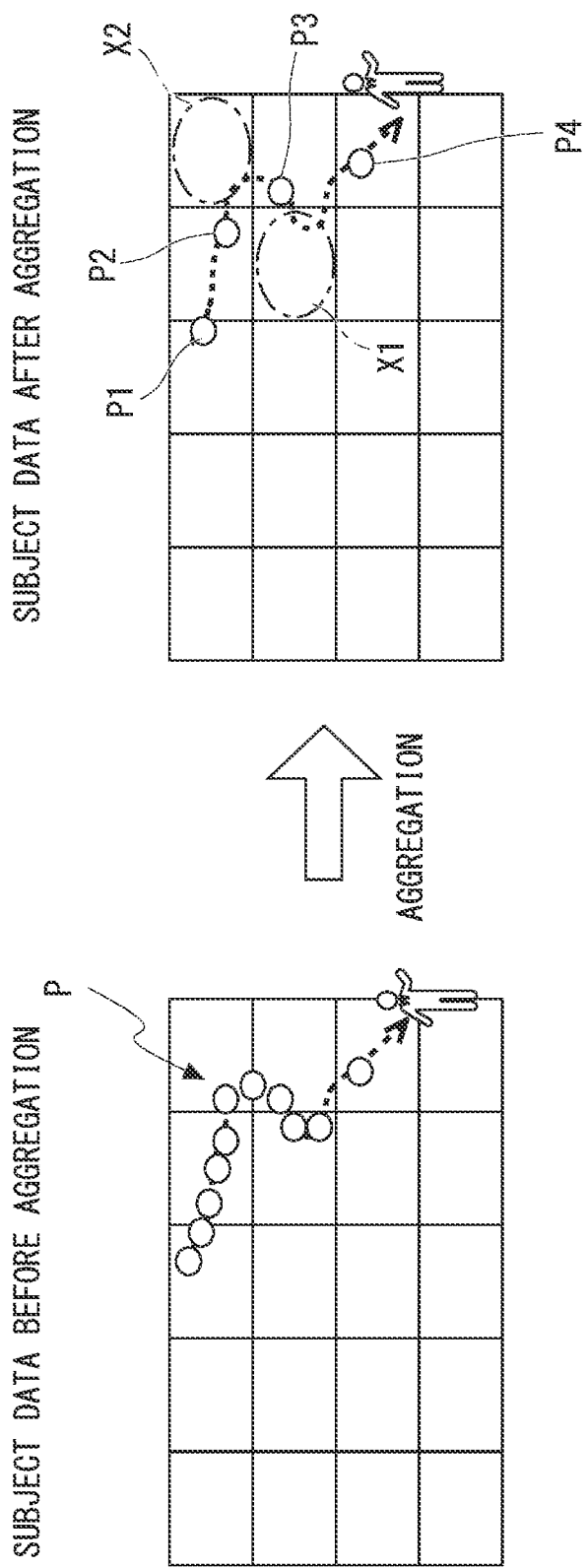
FIG. 4 is a diagram for describing a problem that may occur in related art.

FIG. 4 is a diagram for describing a problem that may occur in related art. Subject data P before the aggregation which is shown on the left side of FIG. 4 is, for example, a set of central coordinates of the presence area of one subject included in each of 11 images captured consecutively at one Frame Per Second (FPS). Then it can be said that the subject data P indicates a locus that meanders from the vicinity of the upper center toward the lower right. The subject data P before the aggregation goes through six areas and the subject is distributed over six areas in 11 seconds.

Then, in order to aggregate the subject data P, the subject data is divided by a predetermined time width. When, for example, the time width is three seconds, the subject data after the division is data sets, each having three coordinates (the last one has two coordinates). Then representative data is generated from each data set. For example, the coordinates that correspond to the intermediate time among the three coordinates are used as the representative data. Therefore, the subject data after the aggregation shown on the right side includes representative data P1, P2, P3, and P4. In this case, the subject data after the aggregation is distributed over four areas in 11 seconds, and no subject is present in areas X1 and X2. That is, as a result of the aggregation, the subject data in the areas X1 and X2 is missing, and the accuracy of analyzing the distribution of the presence locations of the subject is lowered.

Figure 5:
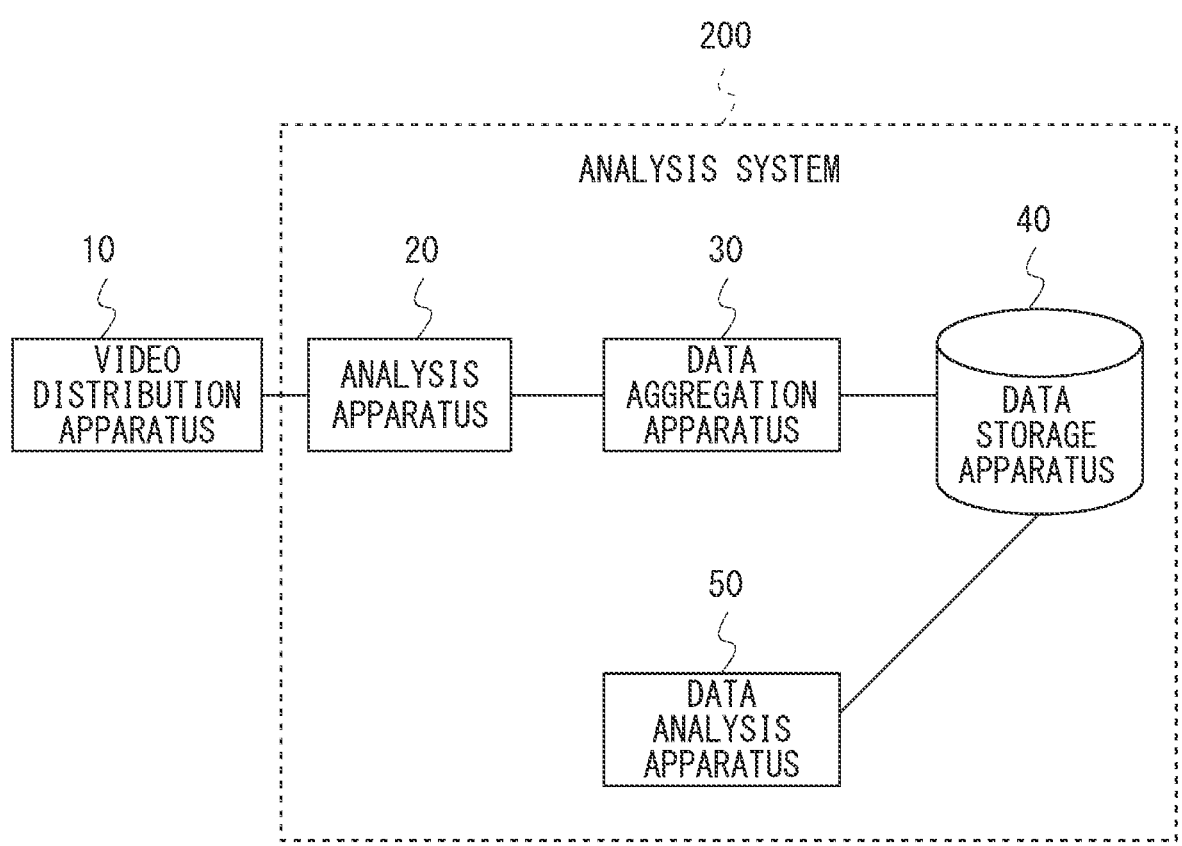
FIG. 5 is a block diagram showing an overall configuration of an analysis system according to a second example embodiment.

The second example embodiment has been made in order to solve at least some of the aforementioned problems. FIG. 5 is a block diagram showing an overall configuration of an analysis system 200 according to the second example embodiment. The analysis system 200 includes an analysis apparatus 20 connected to a video distribution apparatus 10, a data aggregation apparatus 30, a data storage apparatus 40, and a data analysis apparatus 50.

The video distribution apparatus 10 transmits images captured at predetermined intervals by an image-capturing device installed in a predetermined position in the target space where a plurality of subjects are present at least to the analysis apparatus 20. The video distribution apparatus 10 may distribute the images as video images to the analysis apparatus 20 via the network.

The analysis apparatus 20 analyzes a plurality of images continuously received from the video distribution apparatus 10, extracts presence area information in the target space in each of the plurality of subjects included in each image, and outputs the extracted presence area information to the data aggregation apparatus 30 as the time-series data (subject data). It is assumed that the presence area information includes, for example, rectangular coordinates obtained by approximating the presence area of the subject, and that the shooting time, the ID of the subject, and the rectangular coordinates are associated with one another in the subject data.

The data aggregation apparatus 30, which is one example of the aforementioned information processing apparatus 100, buffers the subject data received from the analysis apparatus 20 for a certain period of time, performs the data aggregation processing, and stores the subject data after the aggregation (representative data) in the data storage apparatus 40. The internal configuration of the data aggregation apparatus 30 will be described later.

The data storage apparatus 40 is a storage apparatus that stores subject data after aggregation, that is, a non-volatile storage apparatus. Note that the data storage apparatus 40 may be a storage system including two or more storage apparatuses.

The data analysis apparatus 50 analyzes the distribution regarding the subject in the target space from the representative data stored in the data storage apparatus 40. Here, while the data analysis apparatus 50 according to this example embodiment analyzes the distribution of the presence locations of the subject, the distribution is not limited to this one. Note that each of the video distribution apparatus 10, the analysis apparatus 20, the data aggregation apparatus 30, and the data analysis apparatus 50 may be implemented by one or more information processing apparatuses. Further, a part of the analysis apparatus 20, the data aggregation apparatus 30, and the data analysis apparatus 50 may be implemented on a common information processing apparatus.

Figure 6:
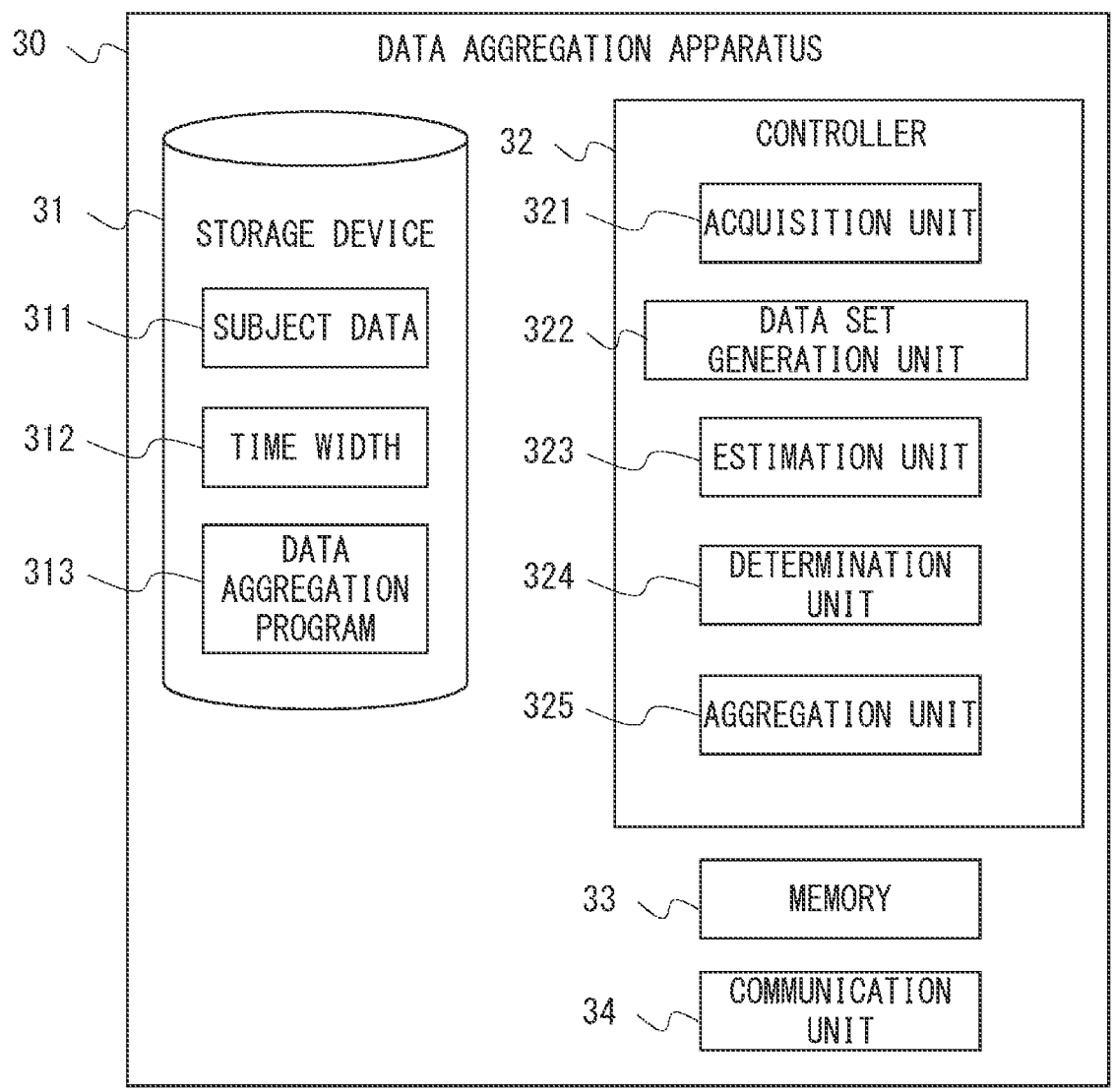
FIG. 6 is a block diagram showing a configuration of a data aggregation apparatus according to the second example embodiment.

FIG. 6 is a block diagram showing a configuration of the data aggregation apparatus 30 according to the second example embodiment. The data aggregation apparatus 30 includes a storage device 31, a controller 32, a memory 33, and a communication unit 34. The storage device 31 is a non-volatile storage device such as a hard disk, a flash memory or the like. The storage device 31 stores subject data 311, a time width 312, and a data aggregation program 313.

The subject data 311 is time-series data received from the analysis apparatus 20. The time width 312 is definition information of a predetermined plurality of time widths. The time width 312 may be, for example, but not limited to, 5 seconds, 10 seconds, 20 seconds, and 40 seconds. It is sufficient that the time width 312 be a desired period of time equal to or longer than two seconds.

The data aggregation program 313 is a computer program in which the processing of the data aggregation method according to this example embodiment is implemented.

The memory 33, which is a volatile storage device such as a Random Access Memory (RAM), is a storage area for temporarily holding information when the controller 32 is operated. The communication unit 34 is an interface that receives/outputs data from/to the outside of the data aggregation apparatus 30. For example, the communication unit 34 outputs data received from the analysis apparatus 20 to the controller 32 and outputs data accepted from the controller 32 to the data storage apparatus 40.

The controller 32 is a processor that controls each configuration of the information processing apparatus 100, that is, a control apparatus. The controller 32 loads the data aggregation program 313 into the memory 33 from the storage device 31 and executes the data aggregation program 313. Accordingly, the controller 32 implements functions of the acquisition unit 321, the data set generation unit 322, the estimation unit 323, the determination unit 324, and the aggregation unit 325.

The acquisition unit 321, which is one example of the aforementioned acquisition unit 110, acquires subject data from the analysis apparatus 20. Then the acquisition unit 321 stores the acquired subject data in the storage device 31.

The data set generation unit 322 is one example of the aforementioned data set generation unit 120. The data set generation unit 322 classifies the subject data (first time-series data) into a plurality of groups for each subject and generates a plurality of data sets for each of the groups. Accordingly, it is possible to perform aggregation on the time-series data in which a plurality of pieces of subject data are included for each subject with a high accuracy. Further, the data set generation unit 322 sets the time point where the determined time width has elapsed from the starting point after the determination by the determination unit 324 to be the next starting point. Then, the data set generation unit 322 generates, after the acquisition unit 321 has acquired the second time-series data for a predetermined period of time from the next starting point, the next plurality of data sets in order to determine the next time width from the second time-series data. Accordingly, it is possible to determine appropriate time widths more finely.

The estimation unit 323 is one example of the aforementioned estimation unit 130. The estimation unit 323 estimates the accuracy of the analysis based on the degree of loss of information other than the representative data in a case in which the aggregation is performed on each of the data sets to the representative data. Accordingly, the accuracy of estimating the accuracy of the analysis is improved. In particular, the estimation unit 323 according to this example embodiment estimates, for each of the plurality of time widths, the accuracy of analyzing the distribution of the presence locations of the subject in the target space when aggregation is performed on each of the plurality of data sets to representative data based on the degree of movement of the position of the specific subject in the target space. Further, the estimation unit 323 estimates the data reduction rate for each time width. Note that an example of a method of calculating the accuracy of classification and the data reduction rate will be described later.

The determination unit 324, which is one example of the aforementioned determination unit 140, calculates, for each of the plurality of time widths, an index value in which the data reduction degree as a result of the aggregation and the accuracy of the analysis are taken into account, and determines the time width that corresponds to the best index value as the time width of the aggregation target. Accordingly, it is possible to determine a time width that further satisfies system requirements more accurately. In particular, the estimation unit 323 according to this example embodiment calculates the satisfaction for each time width as an index value based on the estimated accuracy of the classification and the data reduction rate. The satisfaction here is one example of the index value indicating how satisfactory the accuracy of the classification and the data reduction rate are when they are taken into account comprehensively. An example of the method of calculating the satisfaction will be described later.

The aggregation unit 325 is one example of the aforementioned aggregation unit 150 and performs aggregation on the data set that corresponds to the determined time width to the representative data. Then the aggregation unit 325 stores the aggregated representative data in the data storage apparatus 40.

Figure 7:
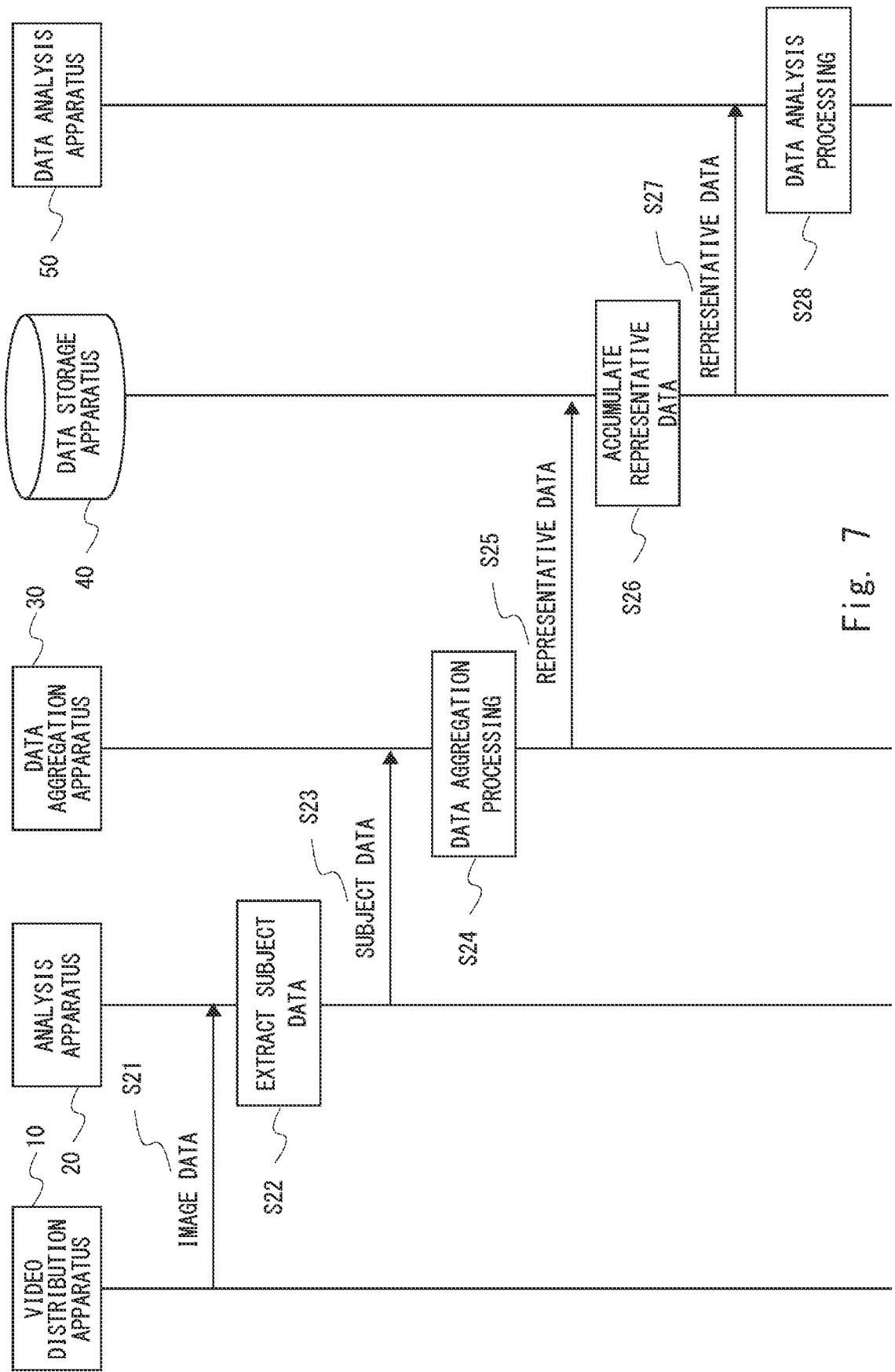
FIG. 7 is a sequence diagram showing a flow of processing of analyzing a distribution regarding a subject from an image according to the second example embodiment.

FIG. 7 is a sequence diagram showing a flow of processing of analyzing a distribution regarding the subject from images according to the second example embodiment. First, the video distribution apparatus 10 transmits the image data that has been captured from the target space to the analysis apparatus 20 (S21).

Next, the analysis apparatus 20 analyzes the received image data and extracts subject data (S22). The analysis apparatus 20 extracts feature points from the image data, recognizes the set of each of the feature points as a subject, and specifies a rectangular area obtained by approximating the presence area of the feature points of each subject. Then the analysis apparatus 20 sets the rectangular area, the ID of the subject, and the shooting time in associated with one another to be subject data. After that, the analysis apparatus 20 outputs the subject data to the data aggregation apparatus 30 (S23).

Figure 8:
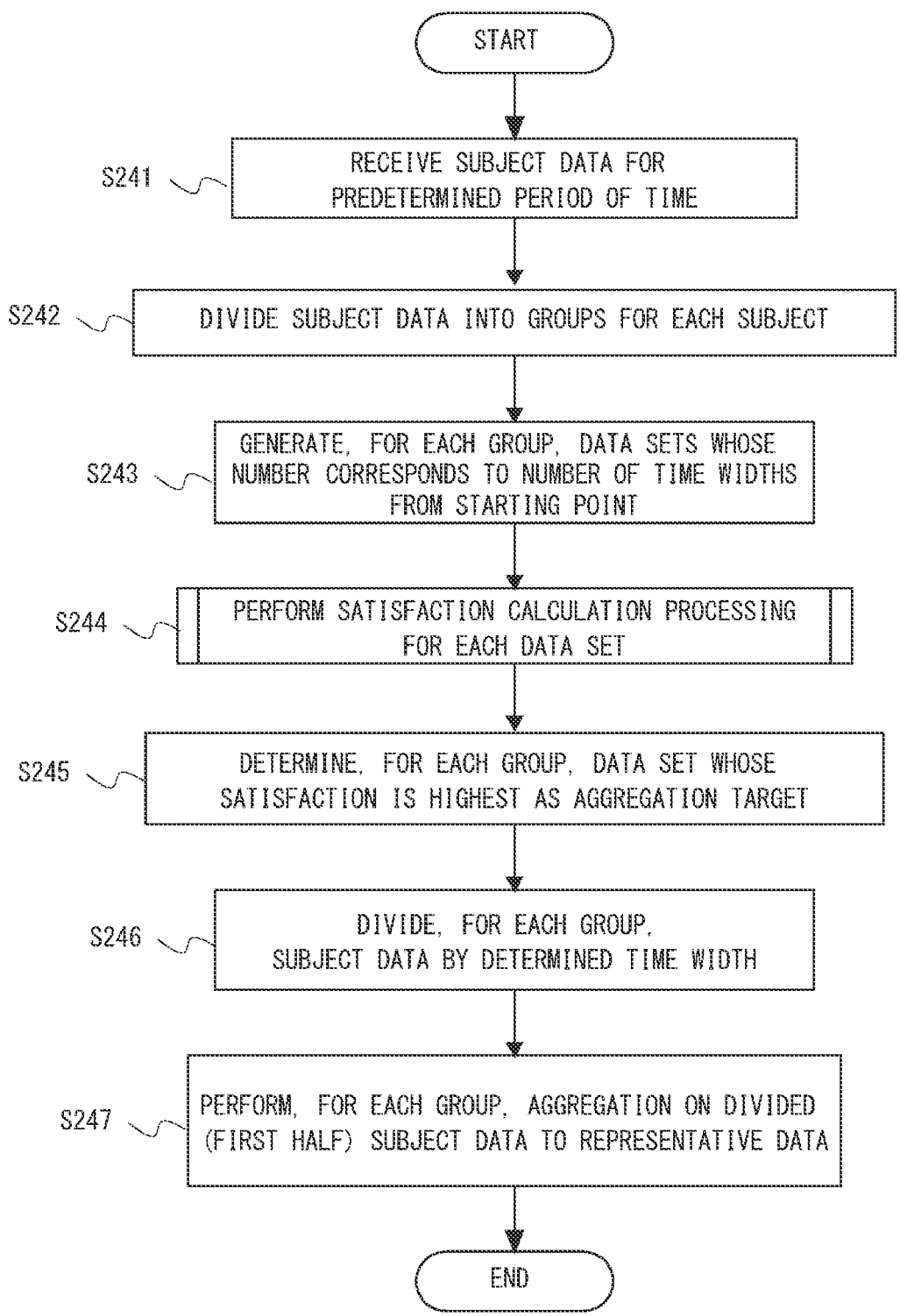
FIG. 8 is a flowchart showing a flow of data aggregation processing according to the second example embodiment.
Figure 9:
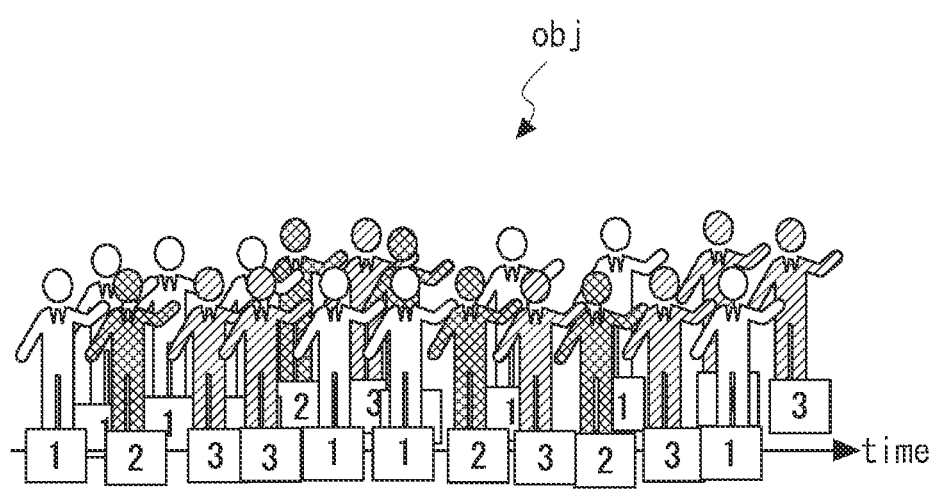
FIG. 9 is a diagram for describing the concept of input subject data according to the second example embodiment.

The data aggregation apparatus 30 performs data aggregation processing on the received subject data (S24). FIG. 8 is a flowchart showing a flow of data aggregation processing according to the second example embodiment. First, the acquisition unit 321 receives the subject data for a predetermined period of time from the analysis apparatus 20 (S241). It is assumed here that the subject data includes presence area information regarding a plurality of subjects. It is further assumed that the predetermined period of time is, for example, 40 seconds, which is the maximum value of the time width, or longer than that. FIG. 9 is a diagram for describing the concept of input subject data obj according to the second example embodiment. FIG. 9 shows that, in the subject data obj, the presence area information regarding three subjects whose subject IDs are 1, 2, and 3 is associated with the shooting time.

Figure 10:
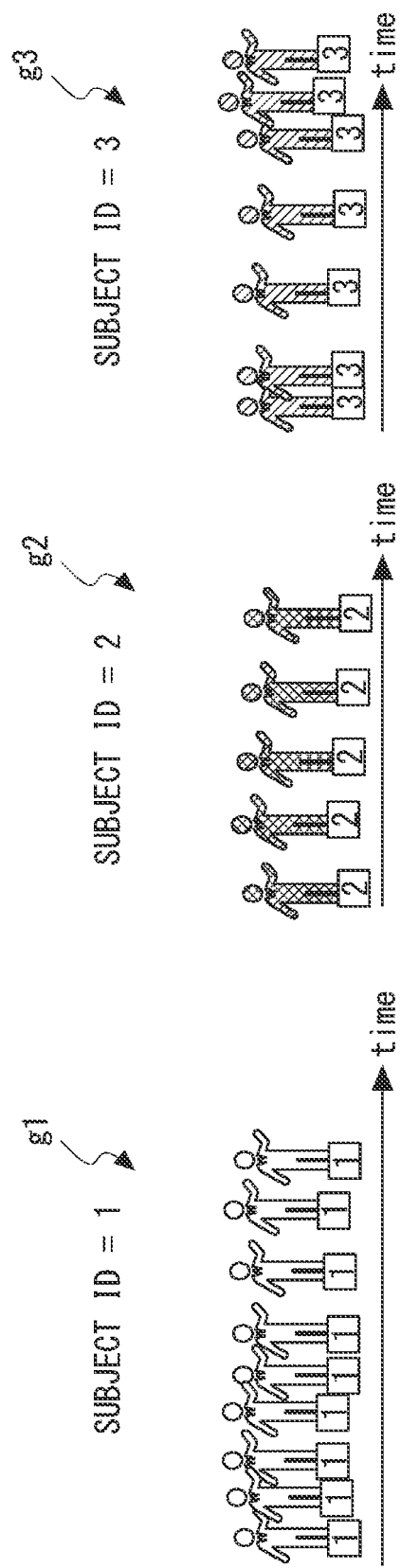
FIG. 10 is a diagram for describing the concept when subject data is divided into groups for each subject ID according to the second example embodiment.

Next, the data set generation unit 322 divides the subject data into groups for each subject (S242). For example, the data set generation unit 322 classifies a rectangular area associated with each subject ID in the subject data into a group (e.g., an array) of the corresponding subject ID. FIG. 10 is a diagram for describing the concept when the subject data is divided into groups for each subject ID according to the second example embodiment. For example, the data set generation unit 322 classifies the rectangular area that corresponds to the subject ID=1 into a subject group g1 with a subject ID=1. Likewise, the data set generation unit 322 classifies the rectangular area that corresponds to the subject ID=2 into a subject group g2 with a subject ID=2. Further, the data set generation unit 322 classifies the rectangular area that corresponds to the subject ID=3 into a subject group g3 with a subject ID=3.

Figure 11:
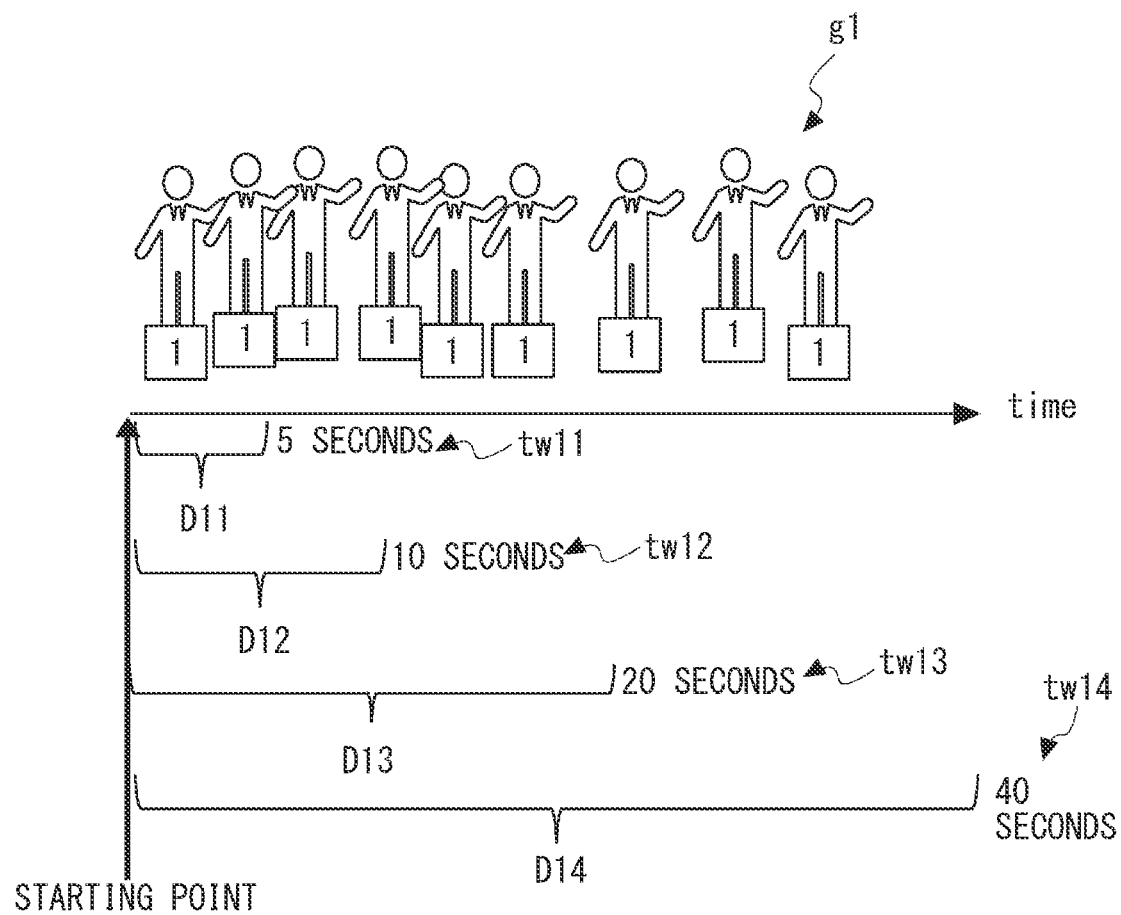
FIG. 11 is a diagram for describing the concept of a subject data group for each time width according to the second example embodiment.

Then the data set generation unit 322 generates, for each group, data sets whose number corresponds to the number of time widths from the starting point (S243). FIG. 11 is a diagram for describing the concept of the subject data group for each time width according to the second example embodiment. While a description will be given of a subject group g1, data sets whose number corresponds to the number of time widths are generated also for subject groups g2 and g3. It is further assumed that the time width 312 includes four time widths, namely, a time width tw11 (for 5 seconds), a time width tw12 (for 10 seconds), a time width tw13 (for 20 seconds), and a time width tw14 (for 40 seconds).

For example, the data set generation unit 322 extracts data for 5 seconds from the starting point of the subject group g1, and sets the extracted data to be a data set D11. Likewise, the data set generation unit 322 extracts data for each of the periods of 10 seconds, 20 seconds, and 40 seconds from the starting point of the subject group g1, and sets the extracted data as data sets D12, D13, and D14.

Figure 12:
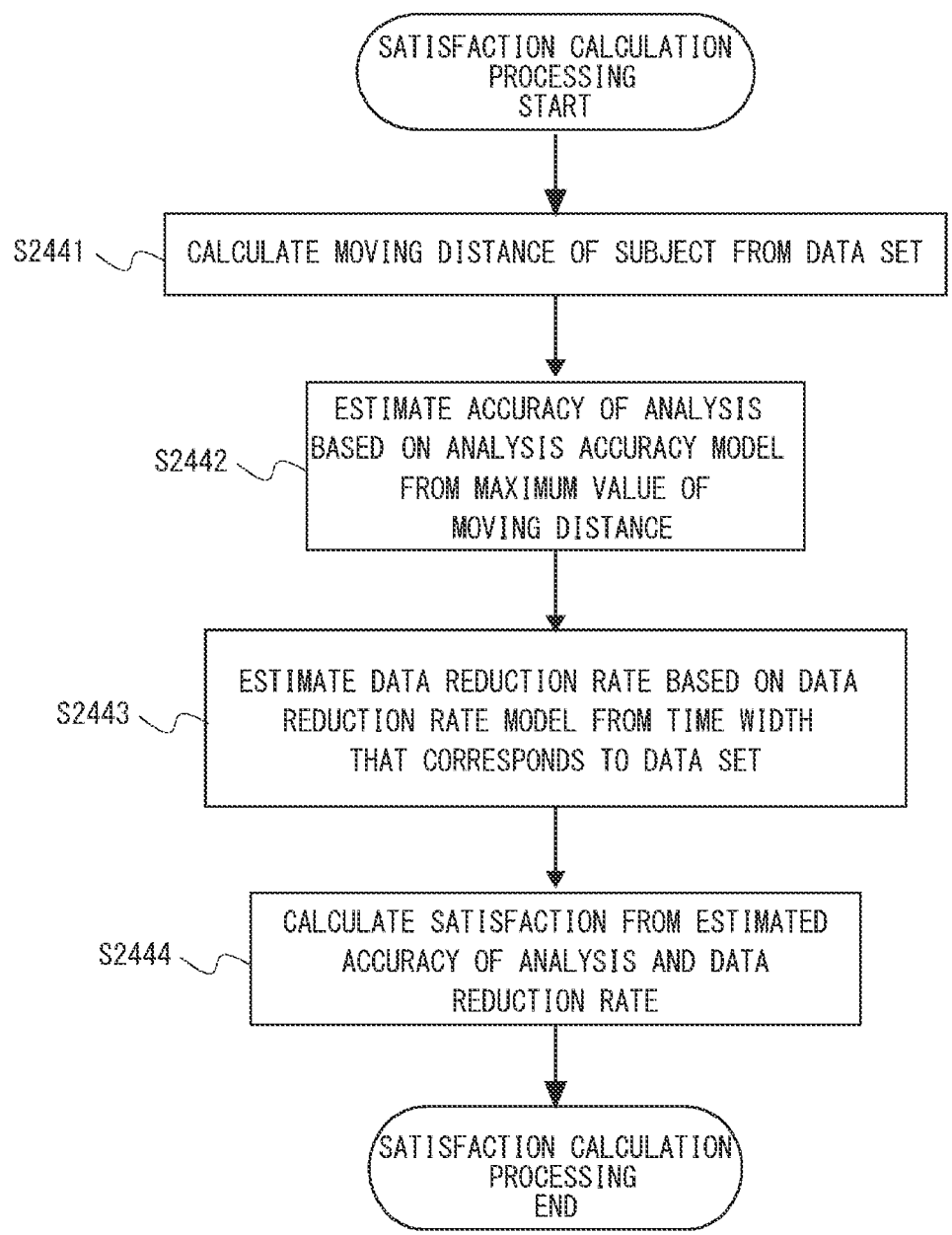
FIG. 12 is a flowchart showing a flow of satisfaction calculation processing according to the second example embodiment.

After that, the estimation unit 323 and the determination unit 324 perform satisfaction calculation processing for each data set (S244). FIG. 12 is a flowchart showing a flow of satisfaction calculation processing according to the second example embodiment. While the data set D11 will be described as a target in this example, the same holds true for the data sets D12, D13, and D14.

First, the estimation unit 323 calculates the moving distance of the subject from the data set D11 (S2441). For example, the estimation unit 323 calculates the maximum value of the moving distance of the central coordinates of each subject data in the data set D11. Next, the estimation unit 323 estimates the accuracy of the analysis based on the analysis accuracy model from the maximum value of the moving distance (S2442). Here, the analysis accuracy model is a model of the accuracy when the distribution of the presence locations of the subject in the target space in the case in which the subject data is aggregated to the representative data is analyzed. The analysis accuracy model may be formulated, for example, by the user from track record data of a combination of the previous data set, representative data after the aggregation and the accuracy of analyzing the representative data, and the accuracy of analyzing the data set before the aggregation. Alternatively, the analysis accuracy model may be a learned model learned by machine learning from the track record data.

Figure 13:
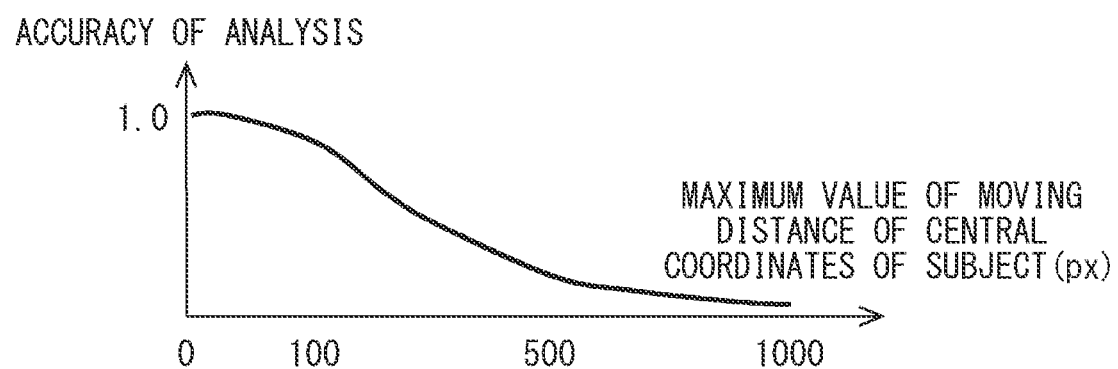
FIG. 13 is a diagram showing an example of an analysis accuracy model of subject data according to the second example embodiment.

FIG. 13 is a diagram showing an example of the analysis accuracy model of the subject data according to the second example embodiment. This example shows that, by inputting the maximum value of the moving distance into the analysis accuracy model, the corresponding accuracy of the analysis can be specified.

Figure 14:
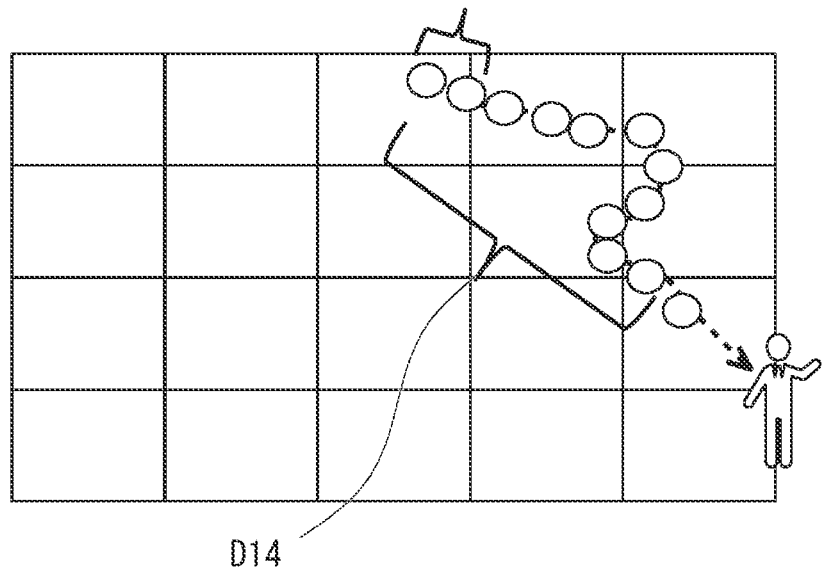
FIG. 14 is a diagram showing one example of a degree of degradation of an accuracy of analyzing a distribution as a result of aggregation in accordance with a time width of the subject data according to the second example embodiment.

FIG. 14 is a diagram showing an example of the degree of degradation of the accuracy of analyzing a distribution due to aggregation in accordance with the time width of the subject data according to the second example embodiment. Since the maximum value of the moving distance is 50 px in the data set D11, when the aggregation is performed in this range and the distribution is analyzed, it is indicated that a mesh that has passed in the time width tw11 (for 5 seconds) but is not counted (mesh that is missing) is not likely to occur. On the other hand, since the maximum value of the moving distance is 500 px in the data set D14, when the aggregation is performed in this range and the distribution is analyzed, it is indicated that a mesh that has passed in the time width tw14 (for 40 seconds) but is not counted (mesh that is missing) is likely to occur. Therefore, it can be said that the accuracy of the analysis of the time width tw11 is higher than that of the time width tw14.

FIG. 15 is a diagram showing an example of the accuracy of the analysis for each time width according to the second example embodiment. FIG. 15 shows a table showing, for each of a case in which the time width is 5 seconds, 10 seconds, 20 seconds, and 40 seconds, the maximum value of the moving distance, and the accuracy of the analysis estimated by the analysis accuracy model from each maximum value. In this example, it is shown that, the shorter the time width is, the higher the accuracy of the analysis is.

Figure 16:
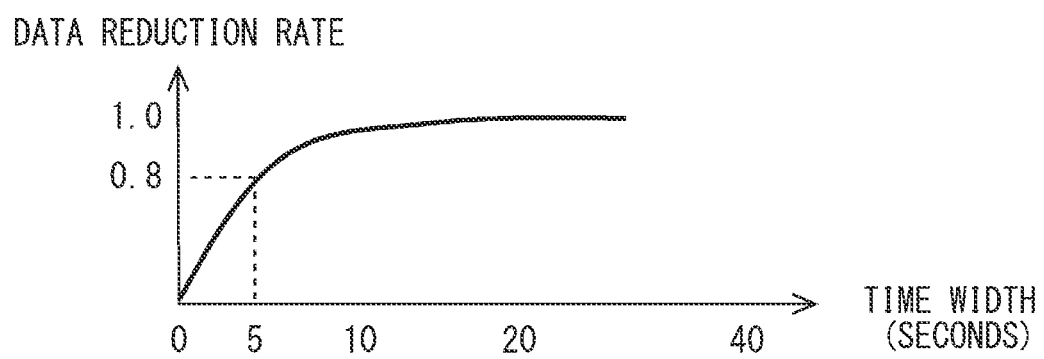
FIG. 16 is a diagram showing an example of a data reduction rate model in accordance with a time width according to the second example embodiment.

Referring once again to FIG. 12, the explanation will be continued. The estimation unit 323 estimates the data reduction rate based on the data reduction rate model from the time width that corresponds to the data set (S2443). The data reduction rate model here is a model of the data reduction rate when the subject data is aggregated for each time width. The data reduction rate model may be formulated, for example, by the user from track record data such as the previous frame rate or the number of pieces of aggregation data for each time width. Alternatively, the data reduction rate model may be a learned model learned by machine learning from the track record data. While the expression: data reduction rate=1−1/(time width) is used as the data reduction rate model in the following example, this is merely one example. FIG. 16 is a diagram showing an example of the data reduction rate model in accordance with the time width according to the second example embodiment.

FIG. 17 is a diagram showing an example of the data reduction rate for each time width according to the second example embodiment. FIG. 17 shows a table showing the data reduction rate estimated (calculated) from each of the time widths of 5 seconds, 10 seconds, 20 seconds, and 40 seconds.

Referring once again to FIG. 12, the explanation will be continued. The determination unit 324 calculates the satisfaction from the estimated accuracy of the analysis and the data reduction rate (S2444). Specifically, the determination unit 324 calculates a satisfaction Sa of the accuracy of the analysis based on the satisfaction model of the accuracy of the analysis from the estimated accuracy of the analysis a. The satisfaction model of the accuracy of the analysis here may be formulated by the user based on system requirements.

Figure 18:
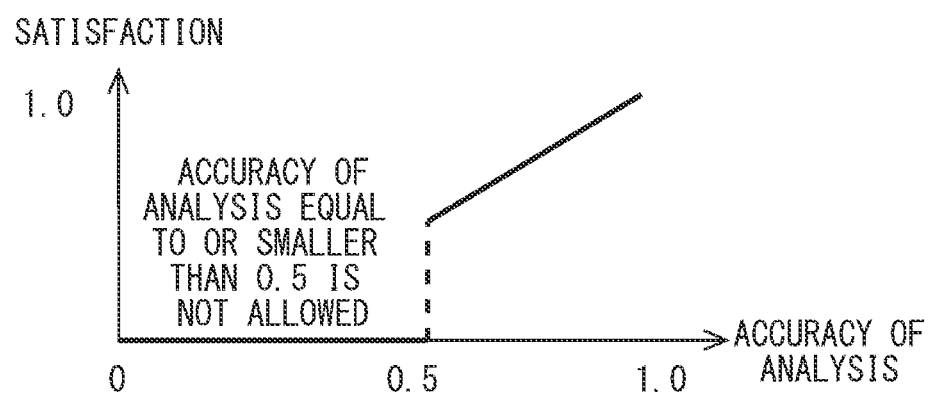
FIG. 18 is a diagram showing an example of a satisfaction model of the accuracy of the analysis according to the second example embodiment.

FIG. 18 is a diagram showing an example of the satisfaction model of the accuracy of the analysis according to the second example embodiment. This satisfaction model shows that, when the accuracy of the analysis a is equal to or smaller than 0.5, the satisfaction Sa becomes 0, assuming that system requirements are not satisfied. Note that the satisfaction model of the accuracy of the analysis is not limited thereto.

The determination unit 324 also calculates a satisfaction Sb of the data reduction rate from an estimated data reduction rate b based on the satisfaction model of the data reduction rate. Here, the satisfaction model of the data reduction rate may be formulated by the user based on system requirements.

Figure 19:
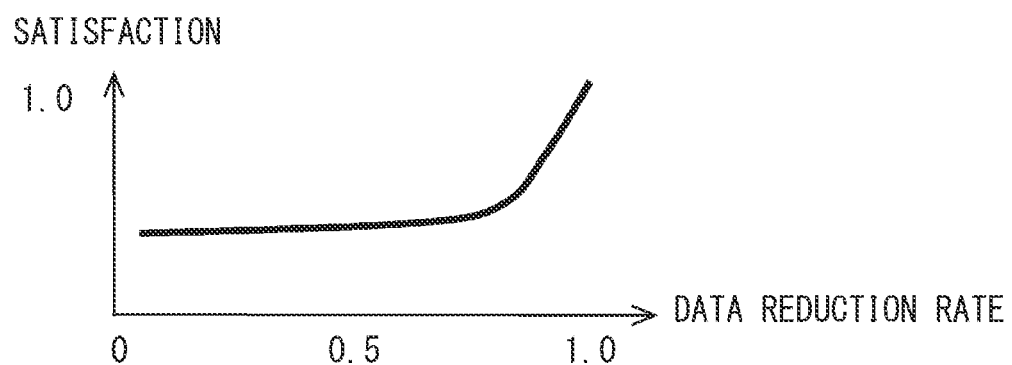
FIG. 19 is a diagram showing an example of the satisfaction model of the data reduction rate according to the second example embodiment.

FIG. 19 is a diagram showing an example of the satisfaction model of the data reduction rate according to the second example embodiment. This satisfaction model shows that the satisfaction Sb is substantially constant until the data reduction rate b reaches about 0.7 and the satisfaction Sb rises sharply when the data reduction rate b approaches 0.8 or 0.9. Note that the satisfaction model of the data reduction rate is not limited to the above one.

After that, the determination unit 324 calculates the overall satisfaction c from the satisfaction Sa of the accuracy of the analysis and the satisfaction Sb of the data reduction rate that have been calculated. The determination unit 324 multiplies, for example, the satisfaction Sa of the accuracy of the analysis by the satisfaction Sb of the data reduction rate to obtain the overall satisfaction c.

The satisfaction calculation processing in Step S244 is executed for each group. Therefore, the determination unit 324 calculates the overall satisfaction c for each of the subject groups g1 to g3.

Referring once again to FIG. 8, the explanation will be continued. The determination unit 324 determines, for each group, the data set whose satisfaction is the highest as an aggregation target (S245). That is, the determination unit 324 selects, for each of the subject groups g1 to g3, the highest satisfaction from among the overall satisfaction c calculated for each time width and determines the data set that corresponds to the selected satisfaction as the aggregation target.

FIG. 20 is a diagram showing an example of the satisfaction for each time width according to the second example embodiment. For example, the highest satisfaction Sa of the accuracy of the analysis is 0.90, which is the number when the time width is 5 seconds, and the lowest satisfaction is 0.0, which is the number when the time width is 40 seconds. Further, the highest satisfaction Sb of the data reduction rate is 0.9, which is the number when the time width is 40 seconds, and the lowest satisfaction is 0.5, which is the number when the time width is 5 seconds. Then, the highest overall satisfaction c calculated from the satisfaction Sa and the satisfaction Sb is 0.595, which is the number when the time width is 10 seconds. That is, when the time width is 10 seconds, it indicates that, although neither the accuracy of the analysis nor the data reduction rate is the highest value in the four time widths, it comprehensively satisfies the system requirements the most.

Referring once again to FIG. 8, the explanation will be continued. The aggregation unit 325 divides, for each group, the subject data by the time width determined in Step S245 (S246). When, for example, the time width of 10 seconds has been determined for the subject group g1, the aggregation unit 325 divides the data set of the subject group g1 into data for 10 seconds from the starting point (first half) and the remaining data. The same holds true for the subject groups g2 and g3.

Figure 21:
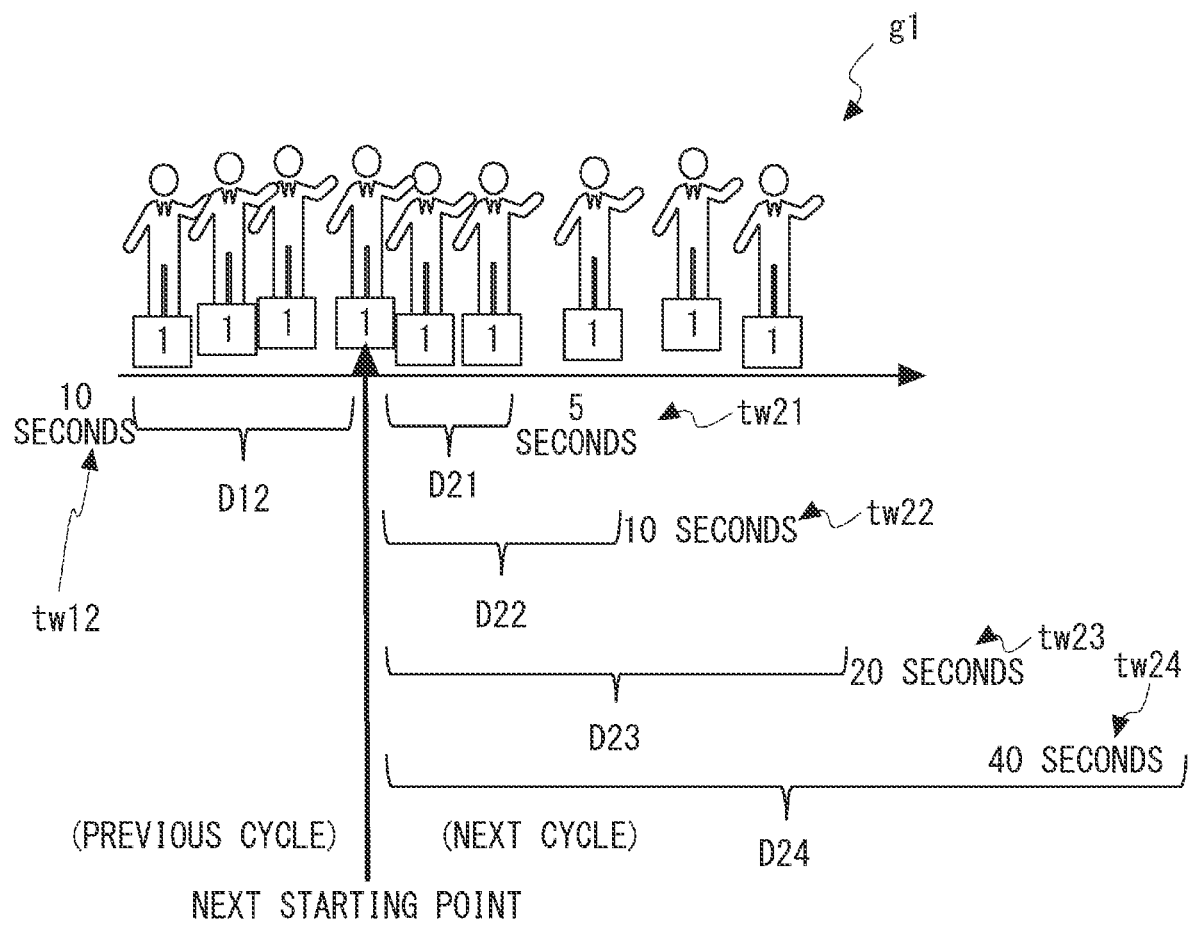
FIG. 21 is a diagram for describing the concept of a starting point of the next time division of the subject data according to the second example embodiment.

FIG. 21 is a diagram for describing the concept of the starting point of the next time division of the subject data g1 according to the second example embodiment. In this example, the aggregation unit 325 divides the first half of the subject group g1 as a data set D12 of the time width tw12 (for 10 seconds). Note that the one generated in Step S242 may be used for the data set D12. Then, the data set generation unit 322 sets the point 10 seconds after the starting point as the next starting point.

Referring once again to FIG. 8, the explanation will be continued. The aggregation unit 325 performs, for each group, aggregation on the divided (the first half) subject data to the representative data (S247).

Referring once again to FIG. 7, the explanation will be continued. The data aggregation apparatus 30 outputs the aggregated representative data to the data storage apparatus 40 (S25). Then the data storage apparatus 40 accumulates the representative data accepted from the data aggregation apparatus 30 in the storage area (S26).

After that, the data analysis apparatus 50 reads out the representative data stored in the data storage apparatus 40 (S27) and performs data analysis processing on the representative data (S28). For example, the data analysis apparatus 50 divides the subject of each representative data into one of a plurality of rectangular areas having a planar mesh shape that correspond to the target space based on rectangular coordinates indicated by a plurality of pieces of representative data, and analyzes the distribution of the presence locations of the subject.

Note that the data analysis apparatus 50 performs data analysis processing at the intervals of, for example, 10 minutes. The intervals of the data analysis processing are preferably longer than the intervals at which the data aggregation processing is executed. This is because when a certain amount of representative data is accumulated in the data storage apparatus 40, it becomes possible to perform more accurate analysis. On the other hand, in order to perform the analysis earlier, the analysis is preferably performed before the number of pieces of representative data becomes too large.

As described above, the second example embodiment estimates the accuracy of analyzing the distribution of the presence locations of the subject in the target space when aggregation is performed on each of the plurality of data sets to the representative data based on the degree of movement of the position of the specific subject in the target space. Therefore, in addition to the effects of the first example embodiment, the congested area in the target space can be specified as a result of the analysis, which makes it easier to predict potential dangers.

Third Example Embodiment

A third example embodiment, which is another specific example of the aforementioned first example embodiment, is a modified example of the second example embodiment. Since the configuration of an analysis system according to the third example embodiment is similar to that shown in FIG. 5, it is not shown and the descriptions of the common configurations will be omitted.

Figure 22:
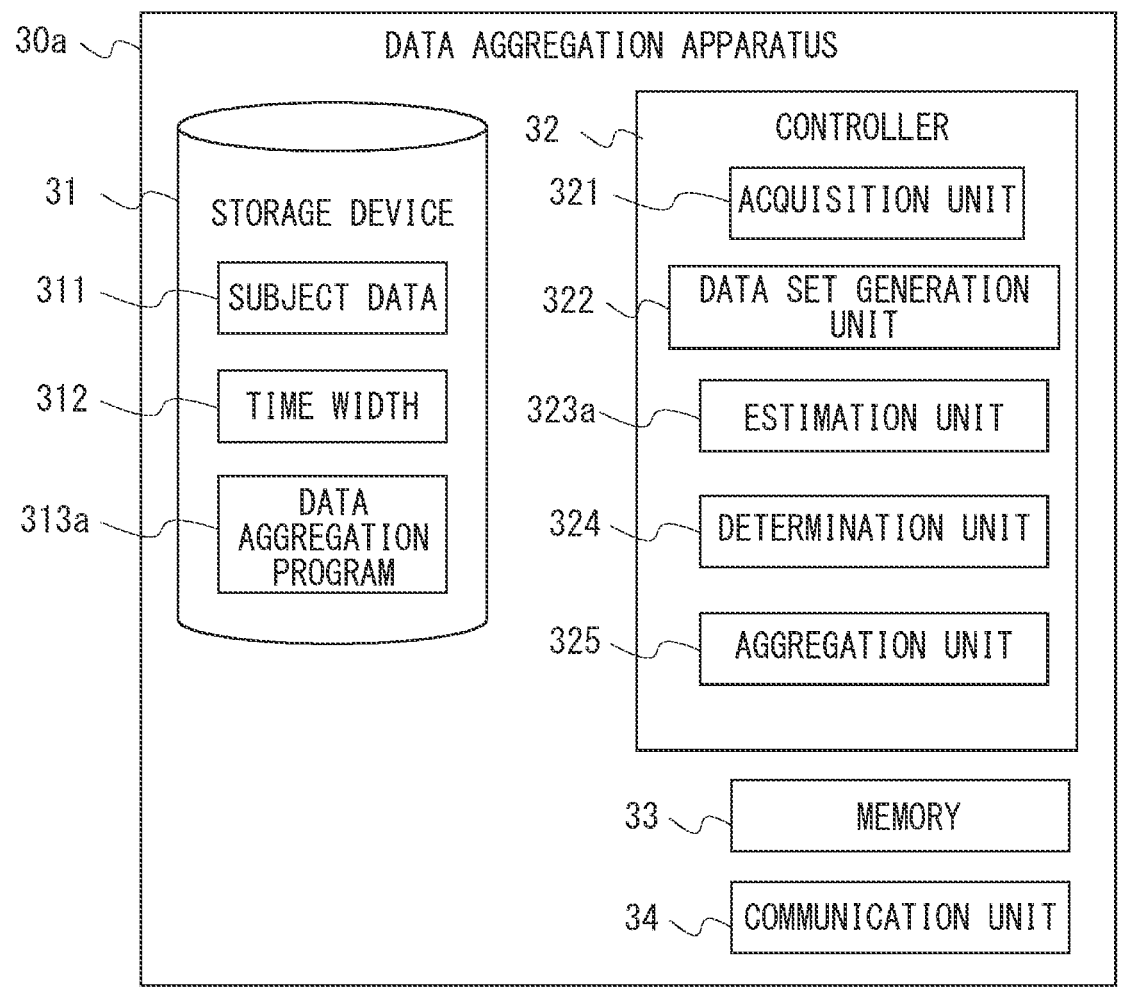
FIG. 22 is a block diagram showing a configuration of a data aggregation apparatus according to a third example embodiment.

FIG. 22 is a block diagram showing a configuration of a data aggregation apparatus 30a according to the third example embodiment. FIG. 22 is different from FIG. 6 in that the data aggregation program 313 and the estimation unit 323 are replaced by a data aggregation program 313a and an estimation unit 323a. Since the other configurations are similar to those of the second example embodiment, the descriptions of the common configurations will be omitted.

The data aggregation program 313a is a computer program in which processing of a searching method according to the third example embodiment is implemented.

The estimation unit 323a estimates, for each of the plurality of time widths, the accuracy of analyzing the distribution of the area sizes of the subject in the target space when aggregation is performed on each of the plurality of data sets to representative data based on the degree of fluctuation of the area size of a specific target in the target space.

Figure 23:
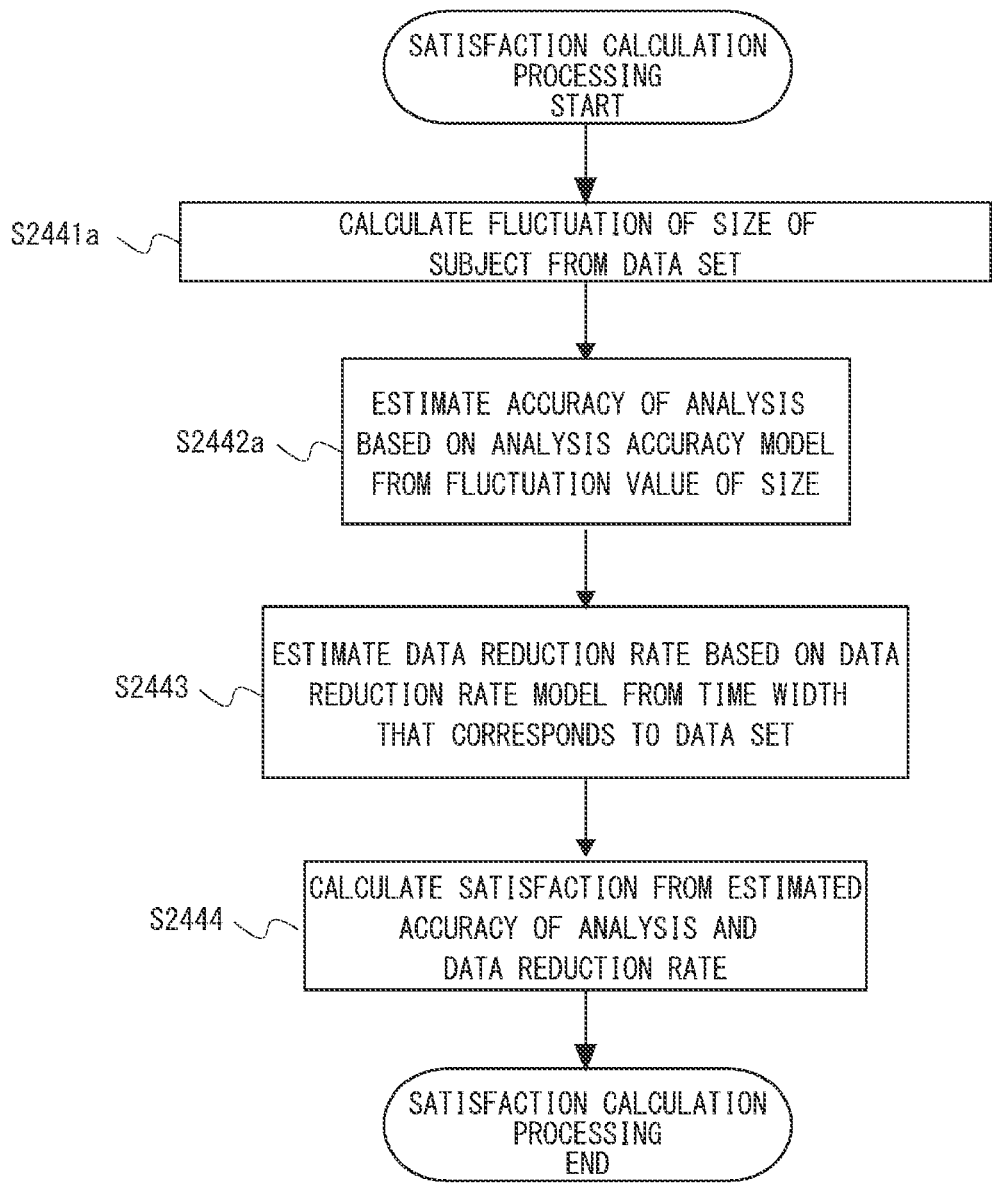
FIG. 23 is a flowchart showing a flow of satisfaction calculation processing according to the third example embodiment.

FIG. 23 is a flowchart showing a flow of satisfaction calculation processing according to the third example embodiment. FIG. 23 is different from FIG. 12 in that Steps S2441 and S2442 are replaced by S2441a and 52442a. Since the other steps are similar to those shown in FIG. 12, the descriptions will be omitted as appropriate.

First, the estimation unit 323a calculates the fluctuation of the size of the subject from the data set D11 (S2441a). The estimation unit 323a calculates, for example, the size of the rectangular area of each subject data in the data set D11. Next, the estimation unit 323 calculates the maximum or minimum difference in the size of the rectangular area as the fluctuation value of the size.

Then the estimation unit 323a estimates the accuracy of the analysis based on the analysis accuracy model from the fluctuation value of the size (S2442a). Here, the analysis accuracy model is a model of the accuracy when the distribution of the area sizes of the subject in the target space in the case in which the subject data is aggregated to the representative data is analyzed. Note that the analysis accuracy model may be a learned model that is formulated by the user or is learned from track record data by machine learning, like in the second example embodiment. The following Steps S2443 and S2444 are similar to those shown in FIG. 12.

Figure 24:
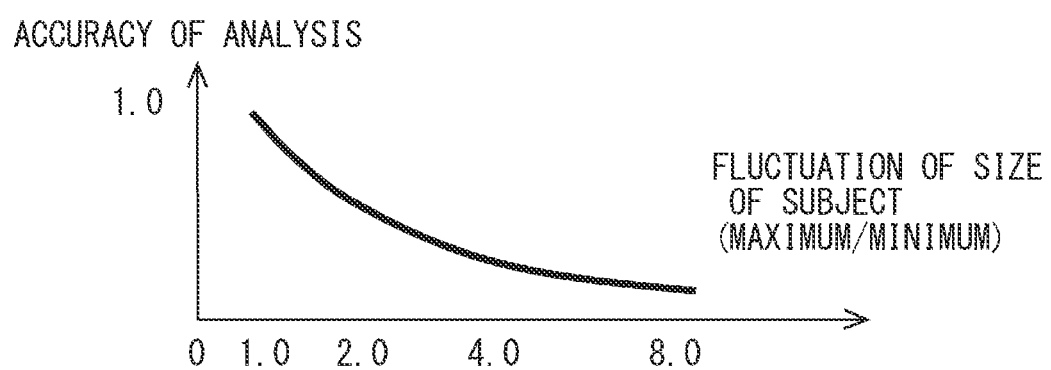
FIG. 24 is a diagram showing an example of an analysis accuracy model of subject data according to the third example embodiment.

FIG. 24 is a diagram showing an example of the analysis accuracy model of the subject data according to the third example embodiment. This example shows that, by inputting the fluctuation value (maximum or minimum) of the size of the subject into the analysis accuracy model, the corresponding accuracy of the analysis can be specified.

FIG. 25 is a diagram showing an example of the fluctuation of the size of the subject data according to the third example embodiment. Since the fluctuation of the size of the subject when the time width is tw11 (5 seconds) is 1.2 times in the data set D11, it can be said that the distance that the subject has moved in front of and behind the camera is shorter than those in the other time widths. Therefore, it is shown that, when the aggregation is performed in this range and then the distribution is analyzed, the data loss in the data section (bin) in the analysis is not likely to occur. On the other hand, since the fluctuation of the size of the subject when the time width is tw14 (40 seconds) is 3.8 times in the data set D14, it can be said that the distance that the subject has moved in front of and behind the camera is longer than those in the other time widths. Therefore, it is shown that, when the aggregation is performed in this range and then the distribution is analyzed, the data loss in the data section (bin) in the analysis is likely to occur.

FIG. 26 is a diagram showing an example of the accuracy of the analysis for each time width according to the third example embodiment. FIG. 26 shows a table showing, for each of the time widths of 5 seconds, 10 seconds, 20 seconds, and 40 seconds, the fluctuation of the size of the subject, and the accuracy of the analysis estimated by the analysis accuracy model from the fluctuation of each size. In this example, it is shown that the shorter the time width is, the higher the accuracy of the analysis is.

Figure 27:
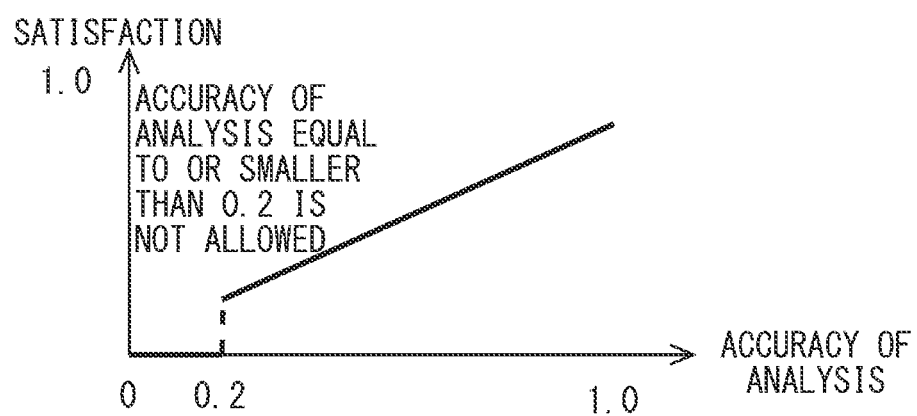
FIG. 27 is a diagram showing an example of a satisfaction model of the accuracy of the analysis according to the third example embodiment.

FIG. 27 is a diagram showing an example of the satisfaction model of the accuracy of the analysis according to the third example embodiment. This satisfaction model indicates that, when the accuracy of the analysis a is 0.2 or smaller, the satisfaction Sa becomes 0, judging that system requirements are not satisfied. Note that the satisfaction model of the accuracy of the analysis is not limited thereto.

Note that the data reduction rate model and the satisfaction model of the data reduction rate model are similar to those in the second example embodiment. The models shown in FIGS. 17 and 19 may be, for example, used.

FIG. 28 is a diagram showing an example of the satisfaction for each time width according to the third example embodiment. For example, the highest satisfaction Sa of the accuracy of the analysis is 0.90, which is the number when the time width is 5 seconds, and the lowest satisfaction Sa is 0.25 which is the number when the time width is 40 seconds. Further, the highest satisfaction Sb of the data reduction rate is 0.9, which is the number when the time width is 40 seconds, and the lowest satisfaction Sb is 0.5, which is the number when the time width is 5 seconds. Then, the highest overall satisfaction c calculated from the satisfaction Sa and the satisfaction Sb is 0.45, which is the number when the time width is 5 seconds. That is, it is shown that, when the time width is 5 seconds, system requirements are comprehensively satisfied the most although the data reduction rate is not the highest in the four time widths.

As described above, in this example embodiment, the distribution of the area sizes of the subject is analyzed as the distribution regarding the subject. It can be assumed here that the actual physical size of the rectangular area of the subject (e.g., the upper body) hardly fluctuates. On the other hand, when one subject is captured by a camera fixed at a specific position, the fact that the size of the rectangular area of the subject fluctuates in each captured image means that the perspective distance between the subject and the camera has fluctuated. If, for example, the size of the subject increases with time, it can be considered that the subject has moved from a position far from the camera to a position near the camera. Then, by analyzing the distance between the subject and the camera, it is possible to determine whether the shooting quality (the size and/or the resolution) is such that the person can be identified by face recognition or the like by the camera. If, for example, 70% of the size distribution of a certain subject is a predetermined size (200 px×200 px) or larger, it can be determined that this subject has been properly captured by the camera.

In view of the above discussed matters, it can be estimated, in this example embodiment, that the smaller the degree of fluctuation in the area size of the subject, the smaller the movement in the perspective direction with respect to the camera, the smaller the data loss due to aggregation, and the higher the accuracy of the analysis is. Accordingly, it is possible to improve the camera placement and settings of the camera.

Other Example Embodiments

In the above example embodiments, each element illustrated in the drawings as a functional block that performs various kinds of processing may be configured by a Central Processing Unit (CPU), a memory, and other circuits in terms of hardware, and is implemented by a program etc. loaded by the CPU in a memory and executed by the CPU in terms of software. Therefore, it will be understood by those skilled in the art that these functional blocks can be implemented in various forms by only hardware, only software, or a combination thereof, and the present disclosure is not limited to any of them.

The above program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-Recordable (CD-R), CD-ReWritable (CD-R/W), and semiconductor memories (such as mask ROM, Programmable ROM (PROM), Erasable PROM (EPROM), flash ROM, Random Access Memory (RAM), etc.). Further, the program(s) be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The present disclosure is not limited to the above example embodiments and may be changed as appropriate without departing from the spirit of the present disclosure. Further, the present disclosure may be executed by combining the example embodiments as appropriate.

The whole or part of the example embodiments disclosed above can be described as, but not limited to, the following supplementary notes.

(Supplementary Note A1)

An information processing apparatus comprising:
an acquisition unit configured to acquire first time-series data including presence area information in a target space in one or more subjects included in a plurality of images captured from the target space in a predetermined period of time;
a data set generation unit configured to generate, from the presence area information regarding a specific subject of the first time-series data, a plurality of data sets for a plurality of different time widths from a starting point of the predetermined period of time;
an estimation unit configured to estimate, for each of the plurality of time widths, an accuracy of analyzing a distribution regarding the subject in the target space in a case in which an aggregation is performed on each of the data sets to representative data based on the presence area information included in each of the plurality of data sets;
a determination unit configured to determine a time width of an aggregation target based on a data reduction degree due to the aggregation in each data set and the accuracy of the analysis; and
an aggregation unit configured to perform aggregation on a data set that corresponds to the determined time width to the representative data.

(Supplementary Note A2)

The information processing apparatus according to Supplementary Note A1, wherein the estimation unit estimates the accuracy of the analysis based on a degree of loss of information other than the representative data in a case in which the aggregation is performed on each of the data sets to the representative data.

(Supplementary Note A3)

The information processing apparatus according to Supplementary Note A1 or A2, wherein the determination unit calculates, for each of the plurality of time widths, an index value in which a data reduction degree as a result of the aggregation and the accuracy of the analysis are taken into account, and determines the time width that corresponds to the best index value as the time width of the aggregation target.

(Supplementary Note A4)

The information processing apparatus according to any one of Supplementary Notes A1 and A3, wherein
the data set generation unit sets a time point where the determined time width has elapsed from the starting point to be the next starting point, and
the data set generation unit generates, after the acquisition unit has acquired second time-series data for the predetermined period of time from the next starting point, the plurality of data sets in order to determine the next time width from the second time-series data.

(Supplementary Note A5)

The information processing apparatus according to any one of Supplementary Notes A1 to A4, wherein the estimation unit estimates, for each of the plurality of time widths, an accuracy of analyzing a distribution of presence locations of the subject in the target space in a case in which aggregation is performed on each of the plurality of data sets to representative data based on a degree of movement of the position of the specific subject in the target space.
(Supplementary Note A6)

The information processing apparatus according to any one of Supplementary Notes A1 to A4, wherein the estimation unit estimates, for each of the plurality of time widths, an accuracy of analyzing a distribution of an area size of the subject in the target space in a case in which aggregation is performed on each of the plurality of data sets to representative data based on a degree of fluctuation of an area size of the specific subject in the target space.
(Supplementary Note A7)

The information processing apparatus according to any one of Supplementary Notes A1 to A6, wherein
the first time-series data includes presence area information in the target space in two or more subjects,
the data set generation unit classifies the first time-series data into a plurality of groups for each subject, and the data set generation unit generates the plurality of data sets for each group.
(Supplementary Note B1)

An analysis system comprising:
an analysis apparatus configured to analyze a plurality of images captured from a target space in which one or more subjects are present in a predetermined period of time and output first time-series data including presence area information in the target space in a subject;
a data aggregation apparatus including: an acquisition unit configured to acquire the first time-series data from the analysis apparatus; a data set generation unit configured to generate, from the presence area information regarding a specific subject of the first time-series data, a plurality of data sets for a plurality of different time widths from a starting point of the predetermined period of time; an estimation unit configured to estimate, for each of the plurality of time widths, an accuracy of analyzing a distribution regarding the subject in the target space in a case in which the aggregation is performed on each of the data sets to representative data based on the presence area information in each of the plurality of data sets; a determination unit configured to determine a time width of an aggregation target based on a data reduction degree due to the aggregation in each data set and the accuracy of analysis; and an aggregation unit configured to perform aggregation on a data set that corresponds to the determined time width to the representative data;
a storage apparatus configured to store the aggregated representative data; and
a data analysis apparatus configured to analyze a distribution regarding the subject in the target space from the representative data stored in the storage apparatus.
(Supplementary Note C1)

A data aggregation method causing a computer to perform the following processing of:
acquiring first time-series data including presence area information in a target space in one or more subjects included in a plurality of images captured from the target space in a predetermined period of time;
generating, from the presence area information regarding a specific subject of the first time-series data, a plurality of data sets for a plurality of different time widths from a starting point of the predetermined period of time;
estimating, for each of the plurality of time widths, an accuracy of analyzing a distribution regarding the subject in the target space in a case in which the aggregation is performed on each of the data sets to representative data based on the presence area information in each of the plurality of data sets;
determining a time width of an aggregation target based on a data reduction degree due to the aggregation in each data set and the accuracy of analysis; and
performing aggregation on a data set that corresponds to the determined time width to the representative data.
(Supplementary Note D1)

A non-transitory computer readable medium storing a data aggregation program for causing a computer to execute the following processing of:
acquiring first time-series data including presence area information in a target space in one or more subjects included in a plurality of images captured from the target space in a predetermined period of time;
generating, from the presence area information regarding a specific subject of the first time-series data, a plurality of data sets for a plurality of different time widths from a starting point of the predetermined period of time;
estimating, for each of the plurality of time widths, an accuracy of analyzing a distribution regarding the subject in the target space in a case in which the aggregation is performed on each of the data sets to representative data based on the presence area information in each of the plurality of data sets;
determining a time width of an aggregation target based on a data reduction degree due to the aggregation in each data set and the accuracy of analysis; and
performing aggregation on a data set that corresponds to the determined time width to the representative data.

While the present disclosure has been described with reference to the example embodiments (and examples), the present disclosure is not limited to the above example embodiments (and examples). Various changes that may be understood by those skilled in the art may be made to the configurations and the details of the present application within the scope of the present disclosure.

REFERENCE SIGNS LIST

100 Information Processing Apparatus
110 Acquisition Unit
120 Data Set Generation Unit
130 Estimation Unit
140 Determination Unit
150 Aggregation Unit
X Area
P Subject Data
P1 Representative Data
P2 Representative Data
P3 Representative Data
P4 Representative Data
X1 Area
X2 Area
10 Video Distribution Apparatus
20 Analysis Apparatus
30 Data Aggregation Apparatus
30a Data Aggregation Apparatus
40 Data Storage Apparatus
50 Data Analysis Apparatus
200 Analysis System 31 Storage Device
311 Subject Data
312 Time Width
313 Data Aggregation Program
313a Data Aggregation Program
32 Controller
321 Acquisition Unit
322 Data Set Generation Unit
323 Estimation Unit
323a Estimation Unit
324 Determination Unit
325 Aggregation Unit
33 Memory
34 Communication Unit
obj Subject Data
g1 Subject Group
g2 Subject Group
g3 Subject Group
tw11 Time Width
tw12 Time Width
tw13 Time Width
tw14 Time Width
tw21 Time Width
tw22 Time Width
tw23 Time Width
tw24 Time Width
D11 Data Set
D12 Data Set
D13 Data Set
D14 Data Set
D21 Data Set
D22 Data Set
D23 Data Set
D24 Data Set

What is claimed is:

1. An information processing apparatus comprising:
at least one memory configured to store instructions, and
at least one processor configured to execute the instructions to:
acquire first time-series data including presence area information specifying where subject is located in a target space, the first time-series data associated with a plurality of images of the target space captured in a predetermined period of time;
generate, from the presence area information regarding the subject, a plurality of data sets for and respectively corresponding to a plurality of different time widths from a starting point of the predetermined period of time;
estimate, for a data set, an accuracy of analyzing a distribution regarding the subject in the target space if aggregation were first performed on the data set;
estimate, for the data set, a data reduction degree that would result if the aggregation were performed on the data set;
determine, from the plurality of different time widths, an aggregation target time width based on the data reduction degree for the data set and accuracy of analysis for the data set; and
perform the aggregation on the data set corresponding to the aggregation target time width, wherein performing the aggregation on the data set corresponding to the aggregation target time width reduces an amount of data while preventing degradation of the accuracy of the analysis.

2. The information processing apparatus according to claim 1, wherein the accuracy of the analysis is estimated based on a degree of loss of information.

3. The information processing apparatus according to claim 1, wherein the at least one processor further configured to execute the instructions to:
calculate, for each time width, an index value in which the data reduction degree as a result of the aggregation and the accuracy of the analysis are taken into account,
wherein the aggregation time width target is determined as the time width having the index value that is best.

4. The information processing apparatus according to claim 1, wherein the at least one processor further configured to execute the instructions to:
set a time point where the plurality of different time width end, as a next starting point;
acquire second time-series data for a second predetermined period of time starting at the next starting point; and
generate a plurality of second data sets for and respectively corresponding to a plurality of second different time widths from the next start point.

5. The information processing apparatus according to claim 1, wherein the accuracy of the analysis is estimated based on a degree of movement of the subject in the target space.

6. The information processing apparatus according to claim 1, wherein the accuracy of the analysis is estimated based on a degree of fluctuation of an area size of the subject in the target space.

7. The information processing apparatus according to claim 1, wherein
the subject is one of a plurality of subjects in the target space and for which the first time-series data includes the presence area information, and
wherein the at least one processor further configured to execute the instructions to:
classify the first time-series data into a plurality of groups for each subject; and
generate the plurality of data sets for each group.

8. A data aggregation method comprising:
acquiring, by a processor, first time-series data including presence area information specifying where subject is located in a target space, the first time-series data associated with a plurality of images of the target space captured in a predetermined period of time;
generate, by the processor, from the presence area information regarding the subject, a plurality of data sets for and respectively corresponding to a plurality of different time widths from a starting point of the predetermined period of time;
estimate, by the processor and for a data set, an accuracy of analyzing a distribution regarding the subject in the target space if aggregation were first performed on the data set;
estimate, by the processor and for the data set, a data reduction degree that would result if the aggregation were performed on the data set;
determine, by the processor and from the plurality of different time widths, an aggregation target time width based on the data reduction degree for the data set and accuracy of analysis for the data set; and
perform by the processor, the aggregation on the data set corresponding to the aggregation target time width, wherein performing the aggregation on the data set corresponding to the aggregation target time width reduces an amount of data while preventing degradation of the accuracy of the analysis.

9. A non-transitory computer readable medium storing a data aggregation program executable by a computer to processing of:
acquiring, by a processor, first time-series data including presence area information specifying where subject is located in a target space, the first time-series data associated with a plurality of images of the target space captured in a predetermined period of time;
generate, by the processor, from the presence area information regarding the subject, a plurality of data sets for and respectively corresponding to a plurality of different time widths from a starting point of the predetermined period of time;
estimate, by the processor and for a data set, an accuracy of analyzing a distribution regarding the subject in the target space if aggregation were first performed on the data set;
estimate, by the processor and for the data set, a data reduction degree that would result if the aggregation were performed on the data set;
determine, by the processor and from the plurality of different time widths, an aggregation target time width based on the data reduction degree for the data set and accuracy of analysis for the data set; and
perform by the processor, the aggregation on the data set corresponding to the aggregation target time width, wherein performing the aggregation on the data set corresponding to the aggregation target time width reduces an amount of data while preventing degradation of the accuracy of the analysis.

* * * * *